United States Patent
Yoshioka et al.

[11] Patent Number: 6,028,407
[45] Date of Patent: Feb. 22, 2000

[54] WIPER CONTROL DEVICE

[75] Inventors: Nobuo Yoshioka; Junichi Takao; Yasuki Matsumoto, all of Yokohama, Japan

[73] Assignee: Jidosha Denki Kogyo Kabushiki Kaisha, Yokohama, Japan

[21] Appl. No.: 09/123,554

[22] Filed: Jul. 29, 1998

[30] Foreign Application Priority Data

Oct. 24, 1997 [JP] Japan ................................. 9-292234
Oct. 24, 1997 [JP] Japan ................................. 9-292270

[51] Int. Cl.⁷ ........................................................ H02P 1/00
[52] U.S. Cl. ................................................ 318/280; 318/443
[58] Field of Search .................................. 318/443, 444, 318/483, DIG. 2, 280–290

[56] References Cited

U.S. PATENT DOCUMENTS

| | | | |
|---|---|---|---|
| 3,649,898 | 3/1972 | Inoue ........................................ | 318/483 |
| 3,869,654 | 3/1975 | Bischoff et al. ......................... | 318/443 |
| 4,091,317 | 5/1978 | Roszyk et al. ........................... | 318/369 |
| 4,286,200 | 8/1981 | Brown ...................................... | 318/443 |
| 4,317,073 | 2/1982 | Blaszkowski ............................ | 318/483 |
| 4,825,134 | 4/1989 | Tracht ...................................... | 318/443 |

FOREIGN PATENT DOCUMENTS 59-95285   6/1984   Japan .

*Primary Examiner*—Robert E. Nappi
*Assistant Examiner*—Rina I. Duda
*Attorney, Agent, or Firm*—Sughrue, Mion, Zinn, Macpeak & Seas, PLLC

[57] ABSTRACT

A wiper control device is provided with a wiper motor rotatable in the forward and reverse directions and a motor control circuit comprising a first and a second relay connected with the wiper motor, a first drive circuit connected to the first relay and a first position detecting circuit in series, a second drive circuit connected to the second relay and a second position detecting circuit in series, a first turning time delaying circuit connected with the second drive circuit in series, and a second turning time delaying circuit connected with the first drive circuit in series.

14 Claims, 20 Drawing Sheets

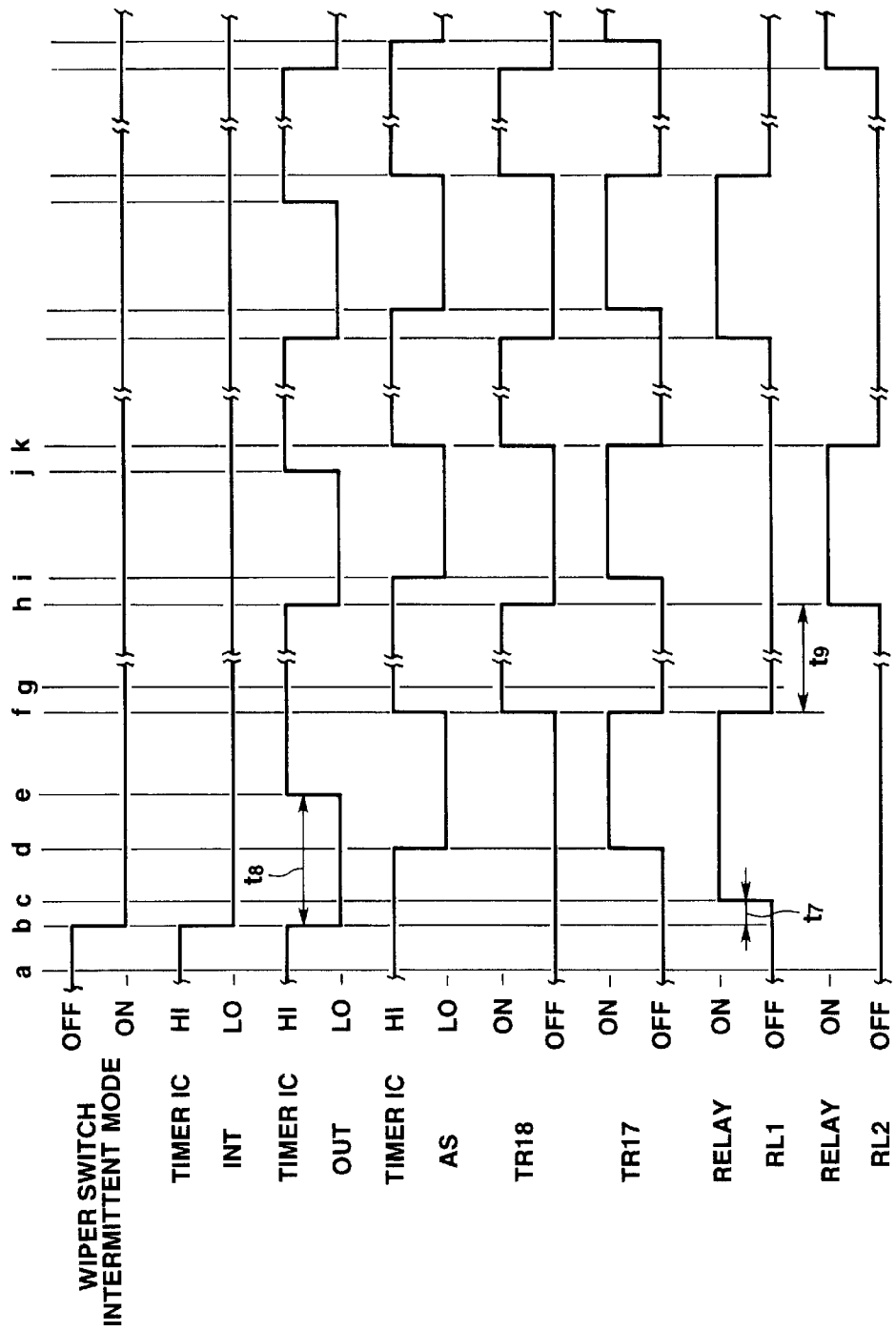

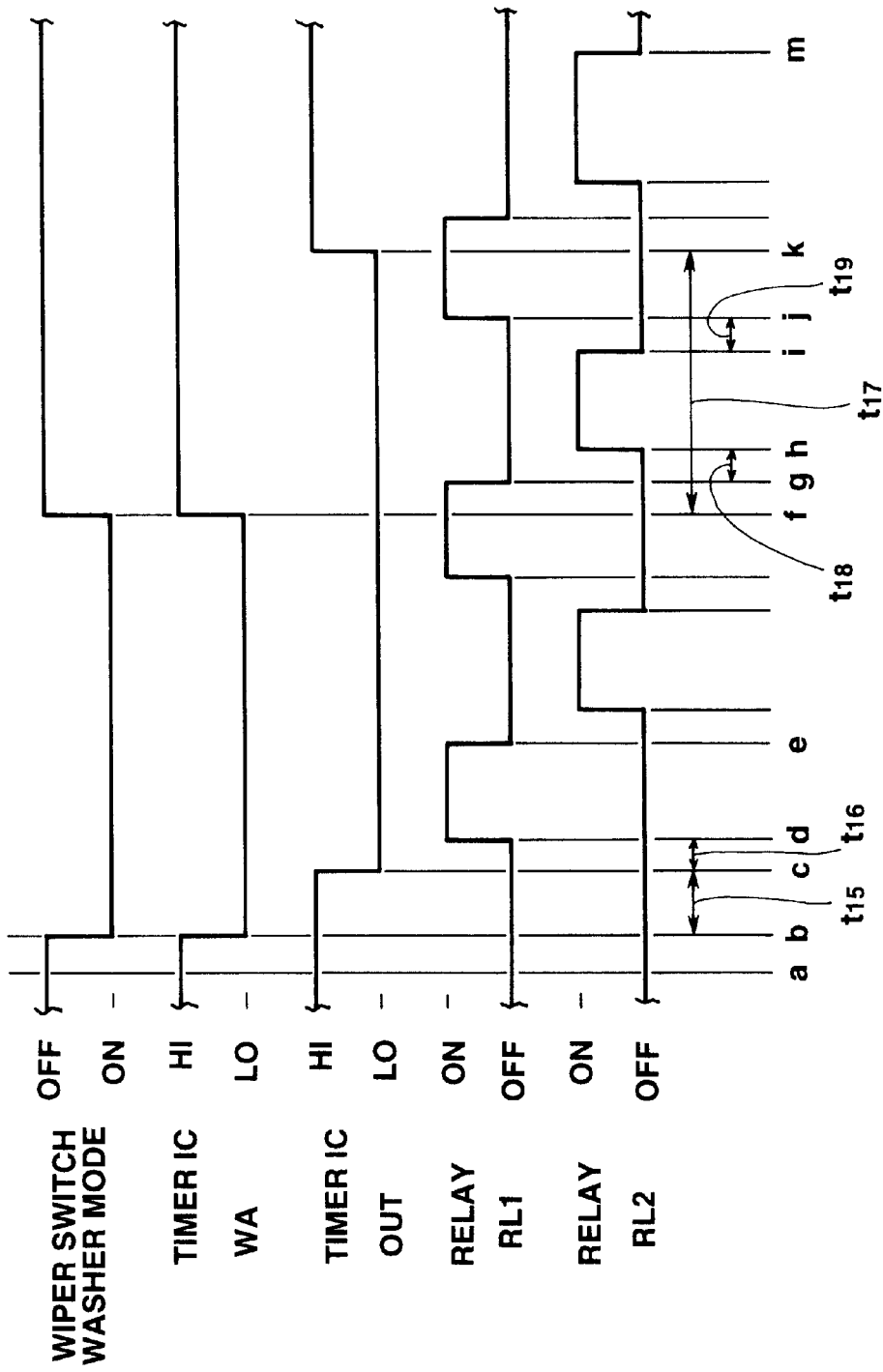

WIPER CONTROL DEVICE

BACKGROUND OF THE INVENTION

1. Field of the Invention

This invention relates to a wiper control device and, more particularly, to a motor control circuit for a wiper motor.

2. Description of the Prior Art

A wiper motor control circuit in a type of driving a wiper arm of the wiper apparatus by rotating the wiper motor in the forward direction and the reverse direction alternately is disclosed in Japanese Examined Utility Model Publication No.3-13082 or U.S. Pat. No. 4,614,903.

In the conventional motor control circuit disclosed in above-mentioned Japanese Utility Model document No.3-13082, it is so structured as to allow an electric current to flow in the wiper motor while a contact of the position detecting switch is in contact with a metallic plate of the cam plate. Therefore, the electric current flowing in the wiper motor becomes discontinuous in a case where the contact condition gets worse between the metallic plate and the contact. In the motor control circuit disclosed in U.S. Pat. No. 4,614,903, an intermission control circuit and a depressed park system are not installed.

SUMMARY OF THE INVENTION

Accordingly, it is a first object of this invention to provide a wiper motor control circuit for driving the wiper arm by rotating the wiper motor in the forward and backward directions.

It is a second object of this invention to provide a wiper motor control circuit designed so as to allow an electric current to flow in the wiper motor while the contact is out of contact with the metallic plate of the position detector for the wiper arm and so as to interrupt the electric current flowing in the wiper motor when the contact is in contact with the metallic plate.

A third object of this invention is to provide a wiper motor control circuit with a depressed park system.

Furthermore, it is a fourth object of this invention to provide a wiper motor control circuit with an intermittent control circuit.

The wiper control device according to this invention is provided with a position switch having a rotating disc combined with a shaft of the motor, a first and a second metallic contact plate disposed on the rotating disc and connected with each other, a first contactor disposed slidably on the rotating disc for generating a first turning signal according to electric contact with the first contact plate, and a second contactor disposed slidably on the rotating disc for generating a second turning signal according to electric contact with the second contact plate; a first relay having a first relay coil and a first relay contact connected to the first terminal of the motor for supplying an electric current to the motor in a forward rotational direction; a second relay having a second relay coil and a second relay contact connected to the second terminal of the motor for supplying an electric current to the motor in a reverse rotational direction; a first drive circuit connected to the first relay coil for supplying an electric current to the first relay coil; a second drive circuit connected to the second relay coil for supplying an electric current to the second relay coil; a first position detecting circuit connected to the first drive circuit and the first contactor of the position switch for detecting the first turning signal and interrupting the electric current supplied to the first relay coil form the first drive circuit; and a second position detecting circuit connected to the second drive circuit and the second contactor of the position switch for detecting the second turning signal and interrupting the electric current supplied to the second relay coil from the second drive circuit.

The wiper control device according to this invention may be further provided with a depressed park circuit connected to the first and second contactors of the position switch and the first and second position detecting circuits for holding the electric current supplied to the second relay coil from the second drive circuit according to the second turning signal generated from the second contactor of the position switch and interrupting the electric current supplied to the second relay coil form the second drive circuit according to the park signal generated from the first contactor of the position switch, and a depressed park prohibition circuit connected to the depressed park circuit and the wiper switch for prohibiting working of the depressed park circuit while the wiper switch is generating the on-signal.

The wiper control device according to this invention may be further provided with an intermission control circuit.

BRIEF DESCRIPTION OF THE DRAWINGS

FIGS. 25 to 28 are time charts illustrating control behavior in the circuit shown in FIG. 24.

DESCRIPTION OF THE PREFERRED EMBODIMENTS

Figure 1:
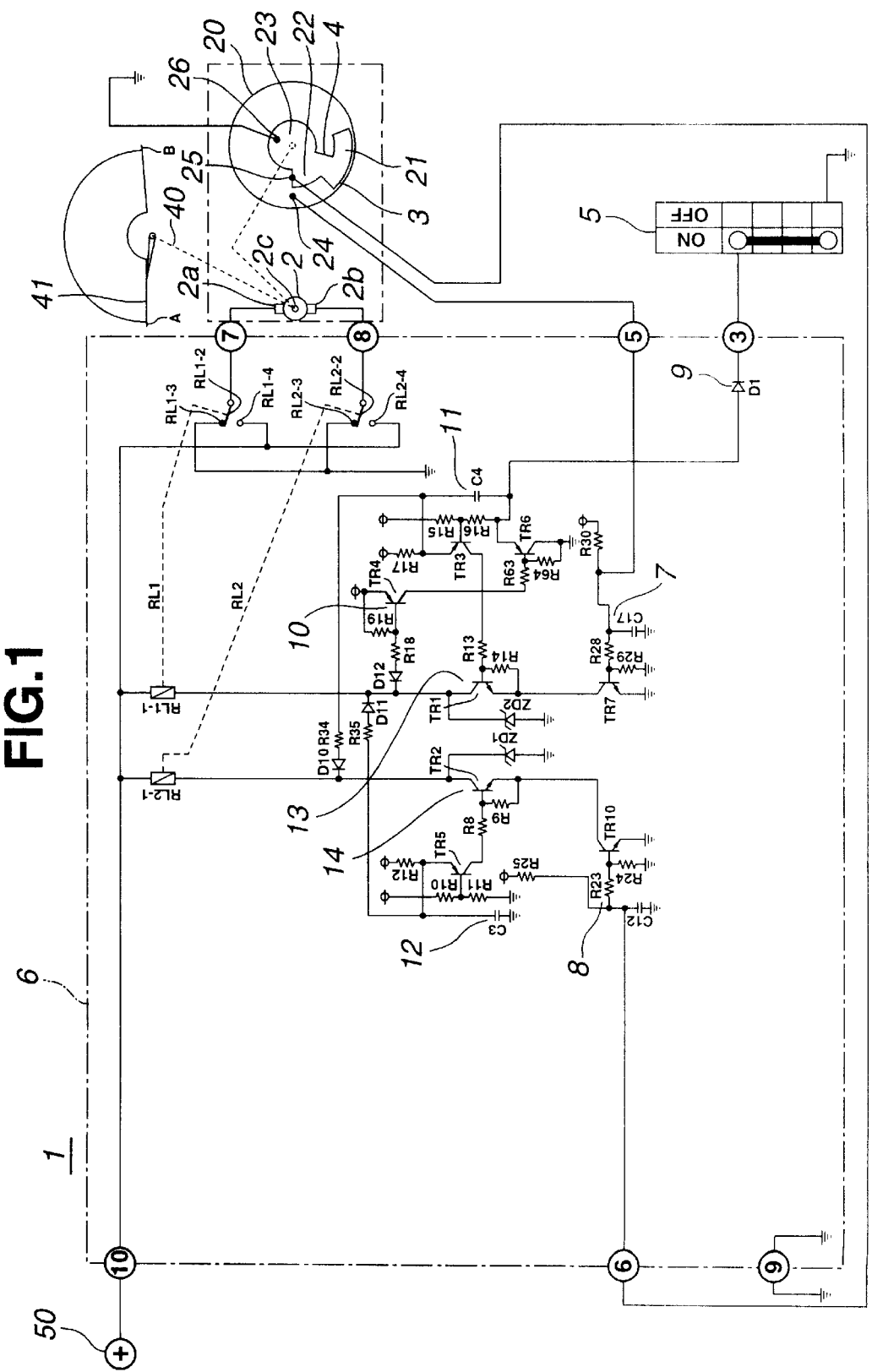
FIG. 1 is a circuit diagram of the wiper control device according to the first example of this invention.

FIG. 1 shows the first example of the wiper control device according to this invention.

The wiper control device 1 shown in FIG. 1 is mainly composed of a motor 2, a position switch 3, a wiper switch 5 and a controller 6, and the controller 6 includes a first position detecting circuit 7, a second position detecting circuit 8, a self-hold circuit 10, a first turning time delaying circuit 11, a second turning time delaying circuit 12, a first drive circuit 13 and a second drive circuit 14.

The motor 2 is provided with a first brush terminal 2a and a second brush terminal 2b, the first brush terminal is connected to No.7 terminal of the controller 6 and the second brush terminal 2b is connected to No.8 terminal.

The motor 2 is further provided with an armature shaft 2c, and the armature shaft 2c is mechanically linked with a wiper blade 41 through a link 40. When an electric current of a power source 50 is supplied to the second brush terminal 2b from the first brush terminal 2a by applying a voltage from the power source 50 on No.7 terminal of the controller 6 and grounding No.8 terminal of the controller 6, the armature shaft 2c is rotated in the forward direction thereby moving the wiper blade 41 from a first turning point A to a second turning point B. When an electric current from the power source 50 flows reversely from the second brush terminal 2b to the first brush terminal 2a by applying the voltage on No.8 terminal of the controller from the power source 50 at the same time of grounding No.7 terminal of the controller 6, the armature shaft 2c of the motor 2 is rotated in the reverse direction and the wiper blade 41 moves to the first turning point A form the second turning point B.

The armature shaft 2c of the motor 2 is connected with a rotor 20 made of an insulating material. The rotor 20 is formed in circular plate-like shape, fixed concentrically on the armature shaft 2c of the motor 2 and so structured as to rotate in the forward and reverse directions together with the armature shaft 2c.

The rotor 20 is disposed with a metallic plate 4 having a first contact plate 21, a second contact plate 22 and a third contact plate 23. The first and second contact plates 21 and 22 are formed in arcuate shape, respectively. The first contact plate 21, the second contact plate 22 and the third contact plate 23 are connected with or disconnected from a first contactor 24, a second contactor 25 and a third contactor 26 respectively according to the rotation of the rotor 20. The first contact plate 21 forms a part of the position switch 3, is disposed on the outer peripheral side of the rotor 20 and has a conductive region with a predetermined angle. The first contactor 24 comes in contact resiliently with the first contact plate 21.

The first contactor 24 also forms another part of the position switch 3 and connected to No.5 terminal of the controller 6. The terminal No.5 of the controller 6 is connected to the third contactor 26 through the second and third contact plates 22 and 23 when the first contactor 24 comes in electric contact with the first contact plate 21 according to the rotation of the rotor 20.

The second contact plate 22 also forms a part of the position switch 3, is disposed on the inner peripheral side of the first contact plate 21 on the rotor 20 in the electrically connected state with the first contact plate 21 and has a conductive region with a predetermined angle. The second contactor 25 comes in contact with the second contact plate 22 resiliently.

The second contactor 25 also forms the other part of the position switch 3 and connected to No.6 terminal of the controller 6. When the second contactor 25 comes in contact with the second contact plate 22 electrically according the rotation of the rotor 20, the terminal No.6 of the controller 6 is connected to the third contactor 26 through the third contact plate 23.

The third contact plate 23 is formed in circular shape and disposed on the further inner peripheral side of the second contact plate 22 in the electrically connected state with the second contact plate 22. The third contactor 26 comes in contact with the third contact plate 23 resiliently.

The third contactor 26 is grounded. The third contactor 26 is always connected electrically with the third contact plate 23, therefore the first and second contact plates 21 and 22 are always grounded through the third contactor 26.

The rotor 20 of the position switch 3 is turned in the anticlockwise direction in FIG. 1 according to the forward rotation of the armature shaft 2c of the motor 2, on the other hand, the rotor 20 is turned in the clockwise direction in FIG. 1 according to the reverse rotation of the armature shaft 2c of the motor 2.

Figure 3:
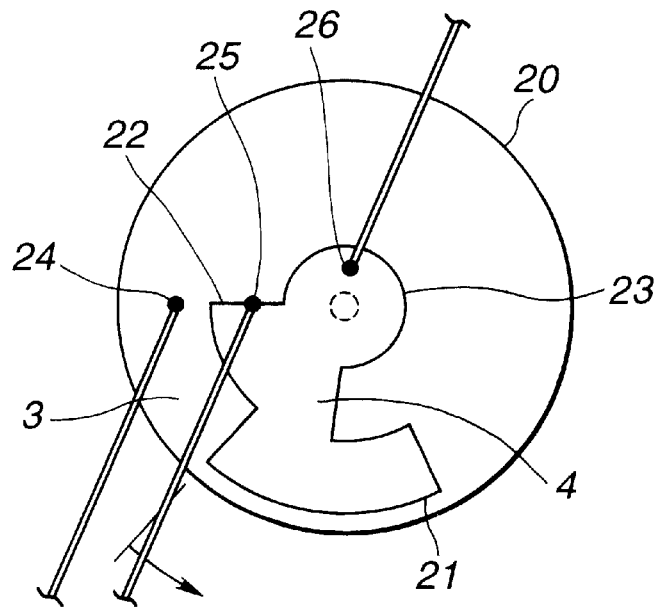
FIGS. 3 to 7 are enlarged illustrations showing action of the position switch in the circuit shown in FIG. 1.

When the wiper blade 41 is in the first turning point A which is the park position, the first contact plate 21 separates from the first contactor 24 as shown in FIG. 3. In this time, the second contact plate 22 is connected electrically with the second contactor 25 and the potential level at the second contactor 25 becomes low, whereby the electric potential of the terminal No.6 of the controller 6 drops to "low level".

Figure 4:
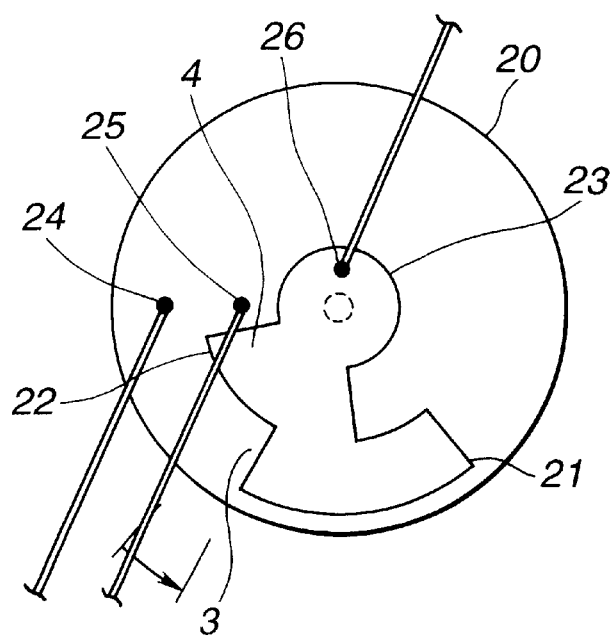

When the wiper blade 41 starts to move toward the second turning point B from the first turning point A according to the forward rotation of the armature shaft 2c of the motor 2, the second contact plate 22 separates from the second contactor 25 as shown in FIG. 4.

Figure 5:
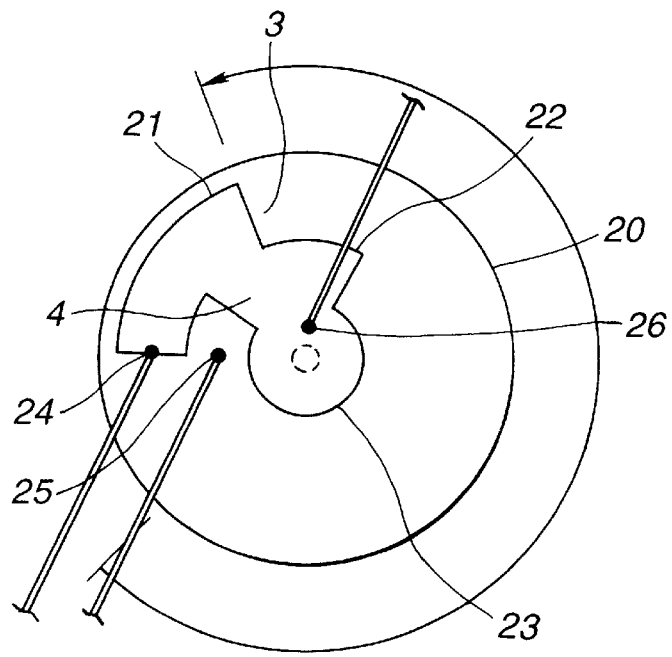

When the armature shaft 2c of the motor 2 is further rotated in the forward direction and the wiper blade 41 arrives at the second turning point B, the potential level at the first contactor 24 becomes low according to the electric contact of the first contact plate 21 with the first contactor 24 as shown in FIG. 5, and the electric potential of the terminal No.5 of the controller 6 drops to "low level".

Figure 6:
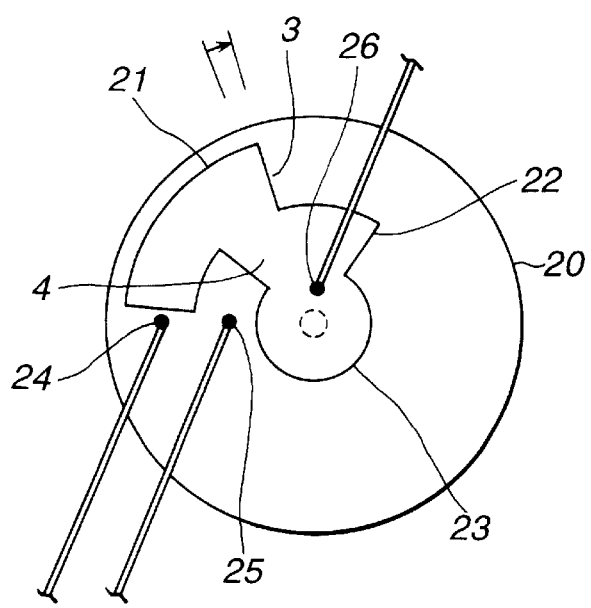

The armature shaft 2c of the motor 2 begins reverse rotation after the wiper blade 41 arrives at the second turning point B. When the wiper blade 41 starts to move toward the first turning point A from the second turning point B, the first contact plate 21 separates from the first contactor 24 again as shown in FIG. 6.

Figure 7:
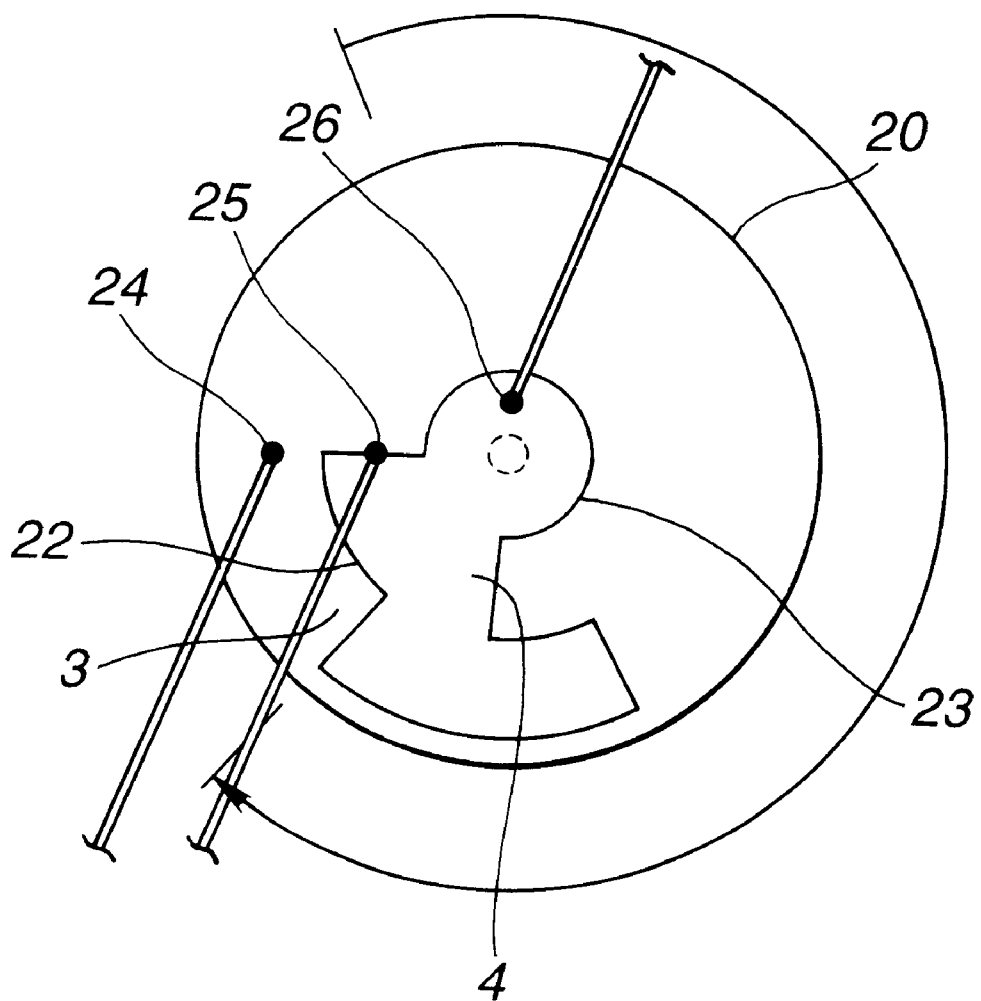

Next, when the wiper blade 41 arrives again at the first turning point A, the second contact plate 22 is connected to the second contactor 25 again as shown in FIG. 7 and the potential level at the contactor 25 becomes low, whereby the terminal No.6 of the controller drops to "low level".

The wiper switch 5 is connected to No.3 terminal provided to the controller 6 and, so structured as to ground the terminal No.3 of the controller 6 in the ON-mode and to open the terminal No.3 of the controller 6 in the OFF-mode.

The first position detecting circuit 7 is composed of resistors R30, R28 and R29, a capacitor C17 and a transistor TR7 (NPN type).

While the first contact plate 21 separates from the first contactor 24 of the position switch 3, the transistor TR7 in the first position detecting circuit 7 is turned on and a conductive path is formed to the emitter of a transistor TR1 in the first drive circuit 14.

When the wiper blade 41 arrives at the second turning point B, the first contact plate 21 is electrically connected to the first contactor 24 and the first contactor 24 drops to "low level". Whereby the transistor TR7 is turned off and the conductive path to the emitter of the transistor TR1 in the first drive circuit 13 is closed.

The second position detecting circuit 8 is composed of transistors R25, R23 and R24, a capacitor C12 and a transistor TR10 (NPN type).

While the second contact plate 22 separates from the second contactor 25 of the position switch 3, the transistor TR10 in the second position detecting circuit 8 is turned on, thereby forming a conductive path to the emitter of a transistor TR2 in the second drive circuit 14.

When the wiper blade 41 arrives at the first turning point A, the second contact plate 22 is electrically connected with the second contactor 25 and the second contactor 25 drops to "low level". Therefore, the transistor TR10 in the second position detecting circuit 8 is turned off and the path to the emitter of the transistor TR2 in the second drive circuit 14 is closed.

If the electric potential at the terminal No.3 of the controller 6 becomes to "low level" by switching the wiper switch 5 into the operating mode ON, a diode 9(D1) is changed on and a transistor TR3 is turned on after passage of time depending on a timer composed of a resistor R17 and a capacitor C4, whereby the transistor TR1 is also turned on.

The self-hold circuit 10 is composed of a diode D12, resistors R18 and R19, a transistor TR4 (PNP type), resistors R63 and R64, and a transistor TR6 (NPN type).

According to the on-state of the transistor TR1 in the first drive circuit 13, the transistor TR4 in the self-hold circuit 10 is turned on and the transistor TR6 is turned on at the same time. The base current of the transistor TR3 in the first drive circuit 13 is held by the transistor TR6 and the transistor TR1 is self-maintained in the on-state while the transistor TR1 is in the on-state even if the diode 9(D1) is turned off by switching the wiper switch 5 into the stop mode OFF from the operating mode ON.

The first turning time delaying circuit 11 is composed of resistors R16, R15 and R17, a capacitor C4, a resistor R34 and a diode D10.

The first turning time delaying circuit 11 maintains the transistor TR3 in the first drive circuit 13 in the off-state while the capacitor C4 is being charged through the resistor R17. The transistor TR3 is turned on when the charging of the capacitor C4 is substantially completed. The time required for charging the capacitor C4 is selected as a turning delay time. The capacitor C4 is discharged through the transistors TR2 and TR10, the resistor R34 and the diode D10 while the transistor TR2 is in the on-state.

The second turning time delaying circuit 12 is composed of resistors R12, R10 and R11, a capacitor C3, a resistor R35 and a diode D11.

In the second turning time delaying circuit 12, a transistor TR5 is the second drive circuit 14 is maintained in the off-state while the capacitor C3 is being charged through the resistor R12. The transistor TR5 is turned on when the charging of the capacitor C4 is completed substantially. The time required for charging the capacitor C4 is selected as a turning delay time. The capacitor C3 is discharged through the transistors TR1 and TR7, the resistor R35 and a diode D11 while the transistor TR1 is in the on-state.

The first drive circuit 13 is composed of a first relay RL1, the transistor TR3 (PNP type), resistors R13 and R14, the transistor TR1 (NPN type) and a zener diode ZD2.

The first relay RL1 is provided with a first relay coil RL1-1, a first movable contact RL1-2, a first normal-closed contact RL1-3 and a first normal-opened contact RL1-4.

The first relay coil RL1-1 is connected to the power source 50 through No.10 terminal of the controller 6 at the upstream terminal thereof, and connected to the cathode of the diode D11 in the second turning time delaying circuit 12, the cathode of the diode D12 in the self-hold circuit 10, the zener diode ZD2 in the first drive circuit 13 and the collector of the transistor TR1 in the first drive circuit 13 respectively at the downstream terminal thereof.

The first movable contact RL1-2 is connected to No.7 terminal of the controller 6, the first normal-closed contact RL1-3 is grounded and the first normal-opened contact RL1-4 is connected to the power source 50 through the terminal No.10 of the controller 6.

When the transistor TR1 is turned on in response to the on-state of the transistor TR3, an electric current flows in the first relay coil RL1-1, whereby the first movable contact RL1-2 separates from the first normal-closed contact RL1-3 and is connected with the first normal-opened contact RL1-4. Therefore, an electric current is supplied to the first brush terminal 2a of the motor 2 from the power source 50 through the terminal No.7 of the controller 6, and the armature shaft 2c of the motor 2 is rotated in the forward direction.

The second drive circuit 14 is composed of a second relay RL2, the transistor TR5 (PNP type), resistors R8 and R9, the transistor TR2 (NPN type) and a zener diode ZD1.

The second relay RL2 is provided with a second relay coil RL2-1, a second movable contact RL2-2, a second normal-closed contact RL2-3 and a second normal-opened contact RL2-4.

The second relay coil RL2-1 is connected to the power source 50 through the terminal No.10 of the controller 6 at the upstream terminal thereof, and connected to the cathode of the diode D10 in the first turning time delaying circuit 11, the zener diode ZD1 in the second drive circuit 14 and the collector of the transistor TR2 in the second drive circuit 14 at the downstream terminal thereof.

The second movable contact RL2-2 is connected to No.8 terminal of the controller 6, the second normal-closed contact RL2-3 is grounded and the second normal-opened contact RL2-4 is connected to the power source 50 through the terminal No.10 of the controller 6.

If the transistor TR2 is turned on according to the on-state of the transistor TR5, an electric current flows in the second relay coil RL2-1, and the second movable contact RL2-2 separates from the second normal-closed contact RL2-3 and is connected with the second normal-opened contact RL2-4. Whereby, an electric current is supplied to the second brush terminal 2b of the motor from the power source 50 through the No.8 terminal of the controller 6 and the armature shaft 2c of the motor 2 is rotated in the reverse direction.

In the aforementioned wiper control device 1, the first position detecting circuit 7 is connected to the first drive circuit 13 is series, and the first turning time delaying circuit 11 is connected to the first drive circuit 13 in series in the controller 6. Furthermore, the second position detecting circuit 8 is connected to the second drive circuit 14 in series, and the second turning time delaying circuit 12 is also connected to the second drive circuit 14 in series.

Figure 2:
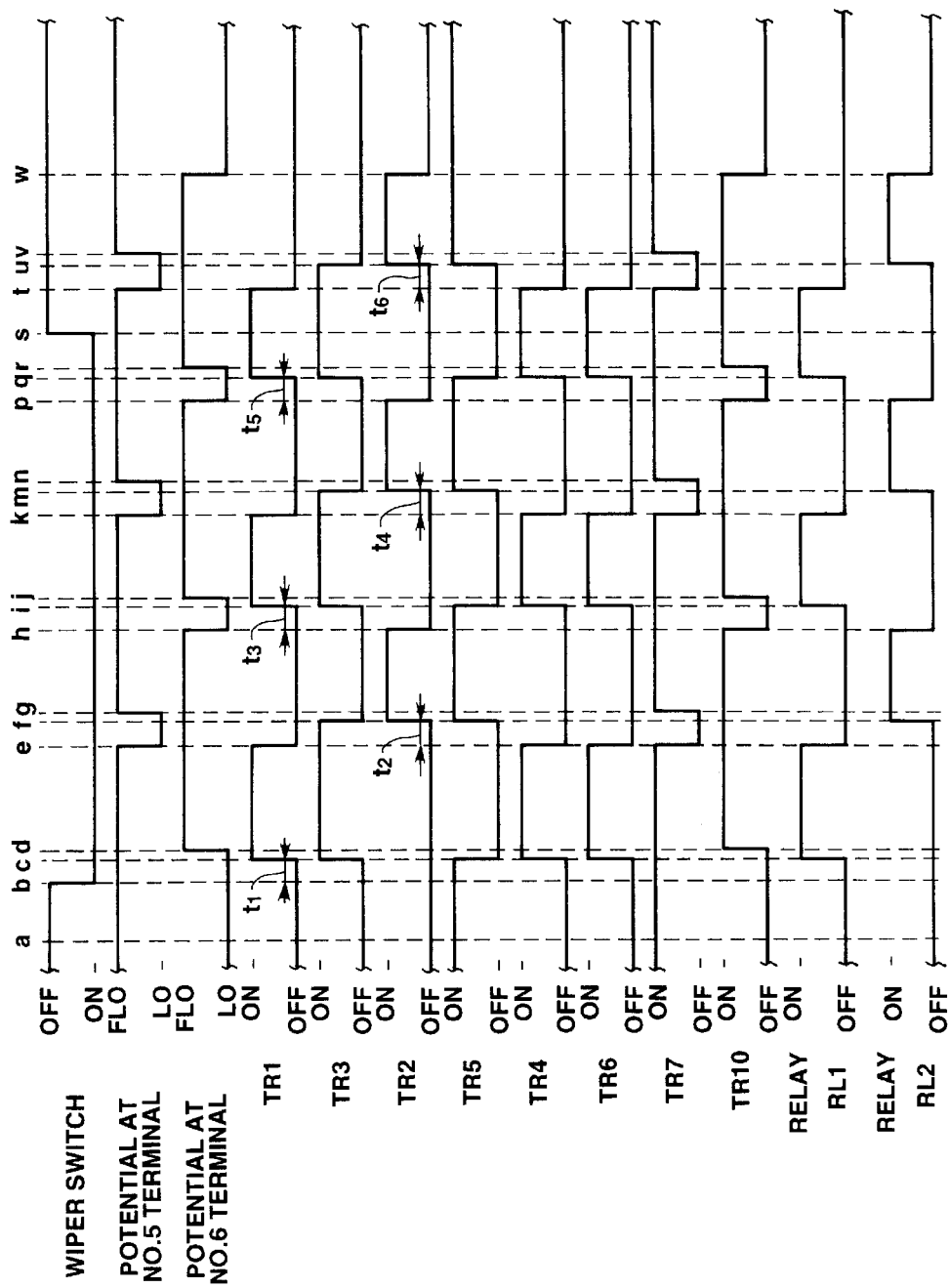
FIG. 2 is a time chart illustrating control behavior in the circuit shown in FIG. 1.

An explanation will be given about the function of the wiper control device 1 having the aforementioned configuration by using the time chart shown in FIG. 2.

At time a, when the wiper switch 5 is in the stop mode OFF, the wiper blade 41 is in the first turning point (park position) A and the electric potential at the terminal No.6 of the controller 6 only drops to "low level" because the first contact plate 21 separates from the first contactor 24 and the second contact plate 22 is connected with the second contactor 25 of the position switch 3 as shown in FIG. 3.

In the controller 6, the transistor TR7 in the first position detecting circuit 7 is turned on and the conductive path leading to the emitter of the transistor TR1 in the first drive circuit 13 is formed since the terminal No.5 does not drop to "low level". However, the transistor TR3 is in the off-state and the transistor TR1 in the first drive circuit 13 is not turned on.

On the other side, since the terminal No.6 drops to "low level", the transistor TR10 in the second position detecting circuit 7 is turned off and the conductive path leading to the emitter of the transistor TR2 in the second drive circuit 14 is opened. Therefore, an electric current does not flow in the transistors TR1 nor TR2, further in the relay coils RL1-1 nor RL2-1.

When the wiper switch 5 is switched into the operating mode ON from the stop mode OFF at time b, the terminal No.3 of the controller 6 is grounded and the capacitor C4 in the first turning time delaying circuit 11 begins to be charged through the resistor R17 and the diode D1.

At time c (after the lapse of time t1 from the time b) when the capacitor C4 in the first turning time delaying circuit 11 is started to be charged and completed to be charged up to a predetermined voltage, the transistors TR3 and TR1 in the first drive circuit 13 are turned on, respectively. In this time, the transistor TR7 is already in the on-state, therefore an electric current flows in the transistors TR7 and TR1. The electric potential at the emitter of the transistor TR5 goes down according to the on-states of the transistors TR7 and TR1, the capacitor C3 is discharged through the resistor R35 and the diode D11, and the transistor TR5 is turned off. The transistors TR4 and TR6 in the self-hold circuit 10 are turned on.

As the transistor TR1 in the first drive circuit 13 is turned on, an electric current flows in the first relay coil RL1-1 of the first relay RL1 in the first drive circuit 13 and the first movable contact RL1-2 is connected to the first normal-opened contact RL1-4. Consequently, an electric current flows in the motor 2 from the power source 50 through the terminal No.7 of the controller 6, the first brush terminal 2a of the motor 2, the second brush terminal 2b of the motor 2, the terminal No.8 of the controller 6, the second movable contact RL2-2 and the second normal-closed contact RL2-3 of the second relay RL2, and the armature shaft 2c of the motor 2 begins to rotate in the forward direction at the time c.

According to the forward rotation of the armature shaft 2c of the motor 2, the wiper blade 41 starts to move from the first turning point A toward the second turning point B and the rotor 20 begins to rotate in the anticlockwise direction shown in FIG. 3. At time d, the second contact plate 22 further separates from the second contactor 25 in the state where the first contact plate 21 is kept out of contact with the first contactor 24 of the position switch 3 as shown in FIG. 4, and the electric potential at the terminal No.6 of the controller 6 becomes to not "low level".

Consequently, the transistor TR10 in the second position detecting circuit 8 is turned on and the conductive path to the emitter of the transistor TR2 in the second drive circuit 14 is formed. However, the transistor TR2 in the second drive circuit 14 is kept in the off-state because the transistor TR5 is not turned on.

When the armature shaft 2c of the motor 2 continues the forward rotation after the time d, and the wiper blade 41 arrives at the second turning point B at time e, the first contact plate 22 is connected with the first contactor 24 in the state where the second contact plate 22 is kept out of contact with the second contactor 25 of the position switch 3 as shown in FIG. 5, and the terminal No.5 of the controller 6 drops to "low level".

The transistor TR7 in the first position detecting circuit 7 is turned off, thereby closing the conductive path to the emitter of the transistor TR1 in the first drive circuit 13. As a result, the transistor TR1 in the first drive circuit 13 is turned off, the electric current flowing in the first relay coil RL1-1 of the first relay RL1 in the first drive circuit RL1 is interrupted and the first movable contact RL1-2 is connected with the first normal-closed contact RL1-3, whereby the electric current supplied to the first brush terminal 2a of the motor 2 is cut off. The first and second brush terminals 2a and 2b of the motor 2 are shorted through the contacts RL1-2, RL1-3, RL2-3 and RL2-2 of the first and second relays RL1 and RL2, therefore the motor 2 loses kinetic energy or electromagnetic energy abruptly.

Accordingly, the motor 2 stops the forward rotation of the armature shaft 2c and the rotation of the rotor 20 is also discontinued.

When the transistor TR1 in the first drive circuit 13 is turned off, the collector of the transistor TR1 and the cathode of the diode D11 are changed from "low level" to "high level", so that the diode D11 becomes non-conductive and the capacitor C3 in the second turning time delaying circuit 12 begins to be charged through the resistor R12. At time f (after the lapse of time t2 from the time e), when the capacitor C3 in the second turning time delaying circuit 12 is charged up to a predetermined voltage, the transistors TR5 and TR2 in the second drive circuit 14 are turned on. An electric current flows in the second relay coil RL2-1 of the second relay RL2 through the transistors TR2 and TR10 since the transistor TR10 is already in the on-state.

The wiper blade 41 suspends at the second turning point B for the time t2 after the transistor TR1 in the first drive circuit 13 is turned off at the time e until the transistor TR2 in the second drive circuit 14 is turned on at the time f. The motor 2 loses the kinetic energy completely during the time duration of t2. According to the on-states of the transistors TR2 and TR10, the electric potential at the emitter of the transistor TR3 drops through the diode D10, thereby discharging the capacitor C4 through the diode D10 and the resistor R34, and the transistor TR3 is turned off.

In response to that the transistor TR2 in the second drive circuit 14 is turned on at the time f, an electric current flows in the second relay coil RL2-1 of the second relay RL2 in the second drive circuit 14 and the second movable contact RL2-2 is connected to the second normal-opened contact RL2-4. Whereby an electric current flows in the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the reverse rotation of the armature 2c of the motor 2 is started.

At the same time of starting the movement of the wiper blade 41 toward the first turning point A from the second turning point B, the rotor 20 begins to rotate in the clockwise direction shown in FIG. 5. Then, the first contact plate 21 separates from the first contactor 24 in the state where the second contact plate 22 is kept out of contact with the second contactor 25 of the position switch 3 as shown in FIG. 6 at time g.

As the electric potential at the terminal No.5 becomes to not "low level", the transistor TR7 in the first position detecting circuit 7 is turned on and the conductive path to the emitter of the transistor TR1 in the first drive circuit 13 is formed. However, the transistor TR3 is in the off-state and the transistor TR1 in the first drive circuit 13 remains in the off-state.

When the armature shaft 2c of the motor 2 is reversely rotated, the wiper blade 41 moves toward the first turning point A and arrives at the first turning point A at time h, the second contact plate 22 is connected with the second contactor 25 in the state where the first contact plate 21 is kept out of contact with the first contactor 24 of the position switch 3 as shown in FIG. 7, thereby turning the terminal No.6 of the controller 6 into "low level".

The transistor TR10 in the second position detecting circuit 8 is turned off, thereby closing the conductive path to the emitter of the transistor TR2 in the second drive circuit 14. Consequently, the transistor TR2 in the second drive circuit 14 is turned off, the electric current flowing in the second relay coil RL2-1 of the second relay RL2 in the second drive circuit 14 is interrupted and the second movable contact RL2-2 is connected with the second normal-closed contact RL2-3, whereby the electric current supplied from the power source 50 to the second brush terminal 2b of the motor 2 is cut off. The brush terminals 2b and 2a are shorted to each other.

Therefore, the motor 2 stops the reverse rotation of the armature shaft 2c, thereby stopping the rotation of the rotor 20.

When the transistor TR2 in the second drive circuit 14 is turned off, the cathode of the diode D10 is turned from "low level" to "high level", therefore the diode D10 becomes into the off-state and the charging of the capacitor C4 in the first turning time delaying circuit 11 is started through the resistor R17. At time i (after the lapse of time t3 from the time h) when the capacitor C4 in the first turning time delaying circuit 11 is charged up to the predetermined voltage, the transistors TR3 in the first drive circuit 13 is turned on again and the transistor TR5 in the first drive circuit 13 is also turned on.

The wiper blade 41 suspends at the first turning point A for the time t3 after the transistor TR2 in the second drive circuit 14 is turned off at the time h until the transistor TR1 in the first drive circuit 13 is turned on again at the time i.

At the time i when the transistor TR1 in the first drive circuit 13 is turned on, the electric current flows in the first relay coil RL1-1 of the first relay RL1 in the first drive circuit 13 and the first movable contact RL1-2 is connected with the first normal-opened contact RL1-4, whereby the electric current flows in the motor 2 from the power source 50 through he terminal No.7 of the controller 6, the first brush terminal 2a of the motor 2, the second brush terminal 2b of the motor 2, the terminal No.8 of the controller 6, the second movable contact RL2-2 and the second normal-closed contact RL2-3, and the armature shaft 2c of the motor starts the forward rotation.

After the motor 2 starts the forward rotation of the armature shaft 2c, the respective circuits in the controller 6 work at time j similarly to the control at the time d, at time k similarly to the control at the time e, at time m similarly to the control at the time f, at time n similarly to the control at the time g, at time p similarly to the control at the time g, at time p similarly to the control at the time h, at time q similarly to the control at the time i, and at time r similarly to the control at the time j.

If the wiper switch 5 is switched over into the stop mode OFF at time s while the wiper blade 41 is moving from the first turning point A toward the second turning point B, the electric potential at the terminal No.3 of the controller 6 becomes to not "low level". In this time, the second contact plate 22 is out of contact with the second contactor 25 and the first contact plate 21 is also out of contact with the first contactor 24 of the position switch 3 as shown similarly in FIG. 4.

In the controller 6, the transistor TR7 in the first position detecting circuit 7, the transistor TR8 in the second position detecting circuit 8, the transistors TR3 and TR1 in the first drive circuit 13, the transistors TR6 and TR4 in the self-hold circuit 10 are turned on, respectively. Therefore, the transistor TR1 in the first drive circuit 13 is maintained in the on-state, the electric current continues to flow in the first relay coil RL1-1 and the armature shaft 2c of the motor 2 continues to rotate forwardly, whereby the wiper blade 41 continues to move toward the second turning point B.

When the wiper blade 41 arrives at the second turning point B at time t, the first contact plate 22 is connected with the first contactor 24 of the position switch 3 as similarly shown in FIG. 5 and the terminal No.5 of the controller 6 drops to "low level".

The transistor TR7 in the first position detecting circuit 7 is turned off, thereby opening the conductive path to the emitter of the transistor TR1 in the first drive circuit 13, therefore the transistor TR1 in the first drive circuit 13 is turned off, the electric current flowing in the first relay coil RL1-1 of the first relay RL1 in the first drive circuit 13 is cut off and the first movable contact RL1-2 is connected with the first normal-closed contact RL1-3, whereby the electric current supplied from the power source 50 to the first brush terminal 2a of the motor 2 is cut off.

Accordingly, the motor 2 stops the forward rotation of the armature shaft 2c, and the rotation of the rotor 20 is also discontinued.

The electric potential at the collector of the transistor TR1 in the first drive circuit 13 rises in accordance with that the transistor TR1 is turned off, the diode D12 is turned off and the transistors TR4 and TR6 in the self-hold circuit 10 are turned off, subsequently the transistor TR3 in the first drive circuit 13 is turned off and the base current of the transistor TR1 disappears.

When the transistor TR1 in the first drive circuit 13 is turned off, the cathode of the diode D11 is changed from "low level" to "high level" and the diode D11 becomes to the off-state, therefore the charging of the capacitor C3 in the second turning time delaying circuit 12 is started. At time u (after the lapse of time t6 from the time t) when the capacitor C3 in the second turning time delaying circuit 12 is charged up to the predetermined voltage, the transistors TR5 and TR2 in the second drive circuit 14 are turned on.

The wiper blade 41 suspends at the second turning point B for the time t6 after the transistor TR1 in the first drive circuit 13 is turned off at the time t until the transistor TR2 in the second drive circuit 14 is turned on at the time u.

According to that the transistor TR2 in the second drive circuit 14 is turned on at the time u, the electric current flows in the second relay coil RL2-1 of the second relay RL2 in the second drive circuit 14 and the second movable contact RL2-2 is connected with the second normal-opened contact RL2-4, therefore the electric current flows in the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the armature shaft 2c of the motor 2 begins to rotate in the reverse direction.

By the start of the reverse rotation of the armature shaft 2c of the motor 2, the wiper blade 41 begins to move from the second turning point B toward the first turning point A and the rotor 20 also begins to rotate in the clockwise direction shown in FIG. 5. At time v, the first contact plate 21 separates from the first contactor 24 in the state where the second contact plate 22 is kept out of contact with the second contactor 25 of the position switch 3 as shown similarly in FIG. 6.

Accordingly, the transistor TR7 in the first position detecting circuit 7 is turned on again, thereby forming the conductive path to the emitter of the transistor TR1 in the first drive circuit 13. But, the transistor TR3 is not turned on, so that the transistor TR1 in the first drive circuit 13 is kept in the off-state.

When the wiper blade 41 arrives at the first turning point A at time w by the reverse rotation of the armature shaft 2c of the motor 2, the second contact plate 22 is connected with the second contactor 25 of the position switch 3 as shown similarly in FIG. 7, whereby the terminal No.6 of the controller 6 drops to "low level".

Because the transistor TR10 in the second position detecting circuit 8 is turned off, thereby opening the conductive path to the emitter of the transistor TR2 in the second drive circuit 14, the transistor TR2 in the second drive circuit 14 is turned off, the electric current flowing in the second relay coil RL2-1 of the second relay RL2 in the second drive circuit 14 is interrupted and the second movable contact RL2-2 is connected with the second normal-closed contact RL2-3, so that the electric current supplied to the second brush terminal 2b of the motor 2 from the power source 50 is cut off.

Although the cathode of the diode D10 is turned to "high level" from "low level" according to the off-state of the transistor TR2 in the second drive circuit 14, the capacitor C4 in the first tuning time delaying circuit 11 is not charged because the wiper switch 5 is switched into the stop mode OFF, and the transistor TR3 in the first drive circuit 13 is not turned on. Accordingly, the transistor TR1 in the first drive circuit is never turned on despite that the transistor TR7 in the first position detecting circuit 7 is in the on-state, and the wiper blade 41 is maintained in the state of arriving at the first turning point A.

Figure 8:
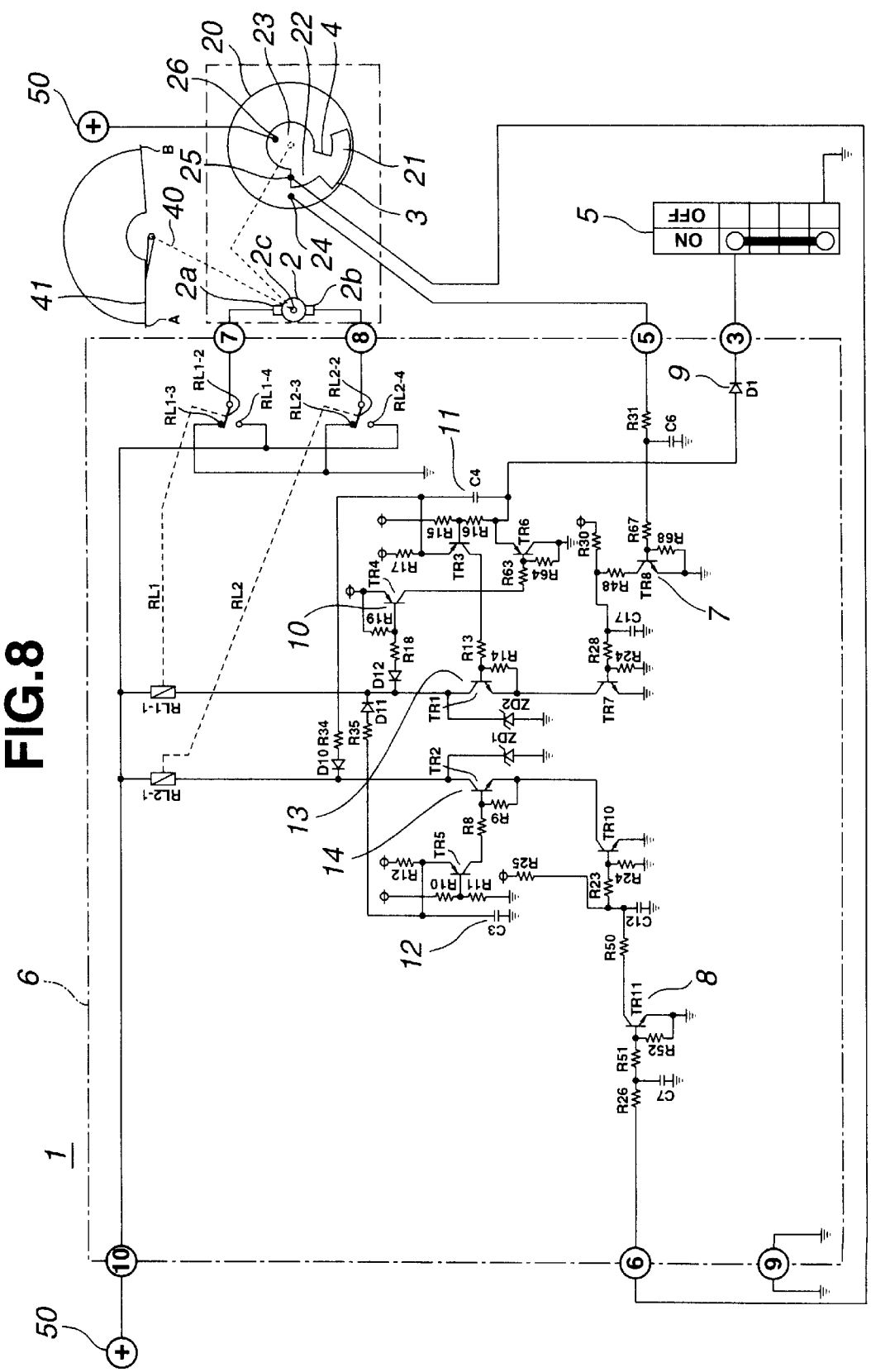
FIG. 8 is a circuit diagram of the wiper control device according to the second example of this invention.

FIG. 8 shows the second example of the wiper control device according to this invention.

In the wiper control device 1 of this example, the first position detecting circuit 7 is composed of the resistors R30, R28 and R29, the capacitor C17, the transistor TR7 (NPN type), a resistor R31, a capacitor C6, resistors R67 and R68, a transistor TR8 (NPN type) and a resistor R48, and the second position detecting circuit 8 is composed of the resistors R25, R23 and R24, the capacitor C12, the transistor TR10 (NPN type), a resistor R26, the capacitor C7, a resistor R51, a transistor TR11 (NPN type) and a resistor R50.

Further in the wiper control device 1, the third contactor 26 of the position switch 3 is connected with the power source 50, and so structured as to be always in contact with the third contact plate 23 electrically during the rotation of the rotor 20. The first and second contact plates 21 and 22 are connected to the power source 50 through the third contact plate 23. The other parts of the control device 1 are structured similarly to the device according to the first example.

When the first contact plate 21 is out of contact with the first contactor 24 of the position switch 3, the terminal No.5 of the controller 6 drops to "low level", so that the transistor TR8 in the first position detecting circuit 7 is turned off and the transistor TR7 is turned on. If the first contact plate 21 is electrically connected with the first contactor 24 of the position switch 3, the terminal No.5 of the controller 6 rises to "high level", so that the transistor TR8 in the first position detecting circuit 7 is turned on and the transistor TR7 is turned off.

Furthermore, when the second contact plate 22 is out of contact with the second contactor 25 of the position switch 3, the terminal No.6 of the controller 6 drops to "low level", therefore the transistor TR11 in the second position detecting circuit 8 is turned off and the transistor TR10 is turned on. If the second contact plate 22 is connected electrically with the second contactor 25 of the position switch 3, the terminal No.6 of the controller rises to "high level", therefore the transistor TR11 in the second position detecting circuit 8 is turned on and the transistor TR10 is turned off.

In the wiper control device 1 in this case, control is carried out similarly to the case of the first example shown in FIG. 2 to 7, accordingly the detailed explanation is omitted.

Figure 9:
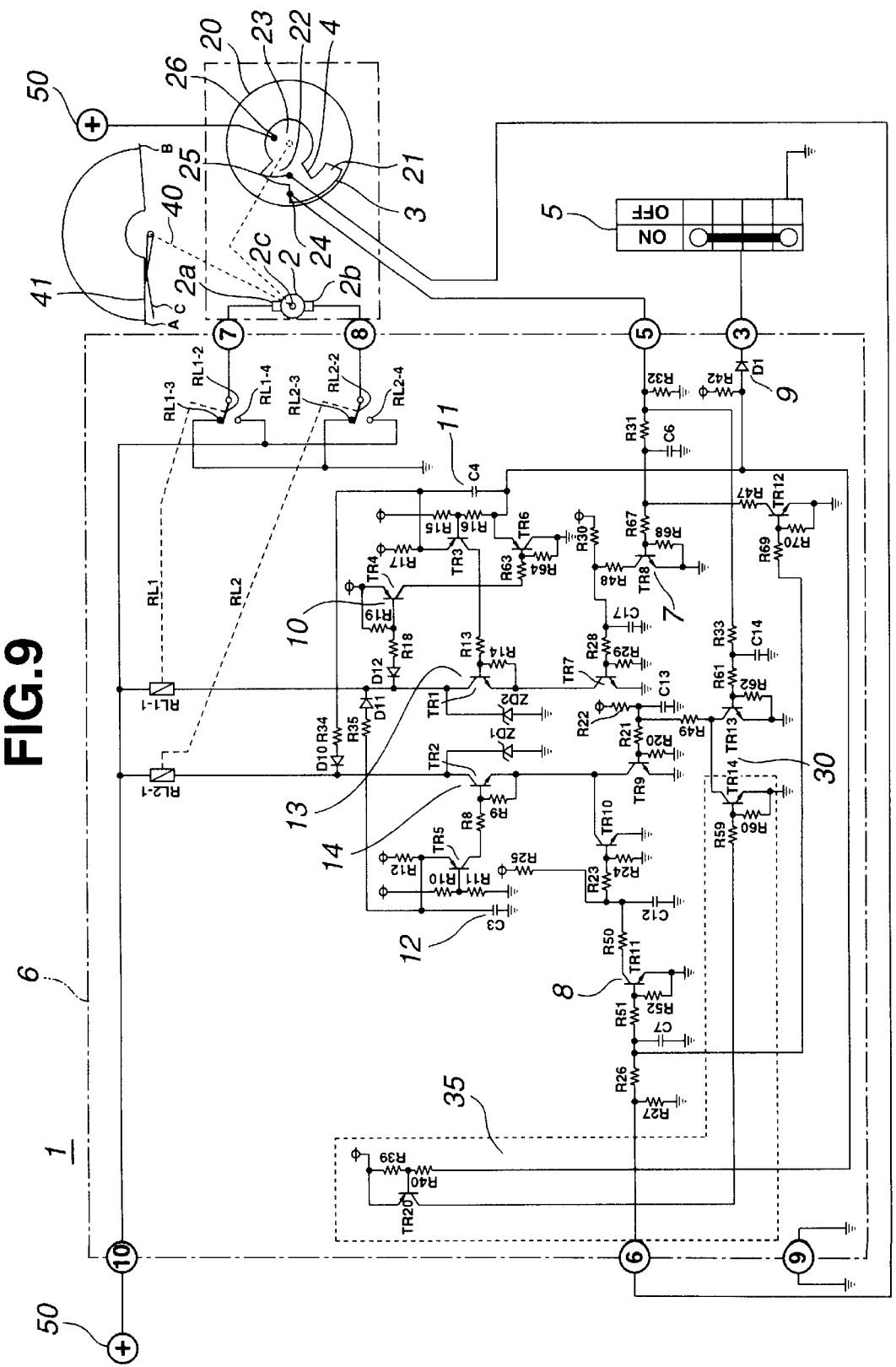
FIG. 9 is a circuit diagram of the wiper control device according to the third example of this invention.

FIG. 9 shows the third example of the wiper control device according to this invention.

Figure 12:
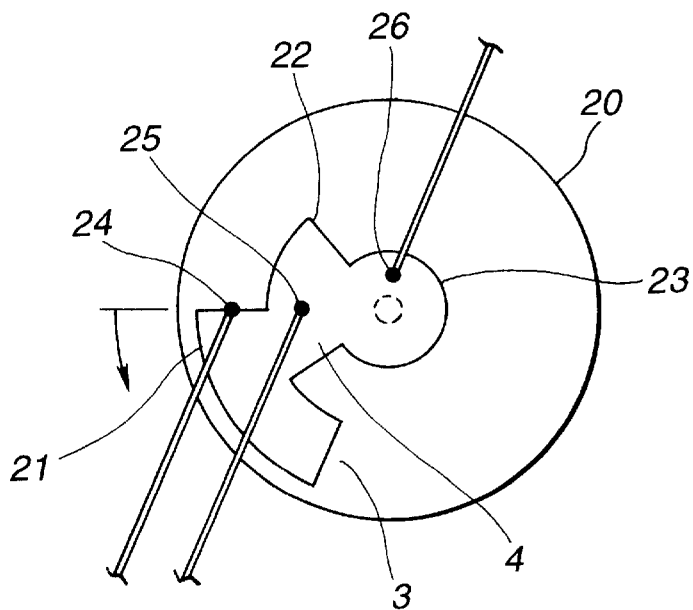
FIGS. 12 to 23 are enlarged illustrations showing action of the position switch in the circuit shown in FIG. 9.

In the wiper control device 1 of this example, a depressed park circuit 30 is added to the controller 6 shown in the second example (FIG. 8), and the position switch 3 is designed so that the first contact plate 21 and the second contact plate 22 may be connected with the first contactor 24 and the second contactor 25, respectively at the time when the wiper blade 41 is in a depressed park position C as shown in FIG. 12.

Figure 17:
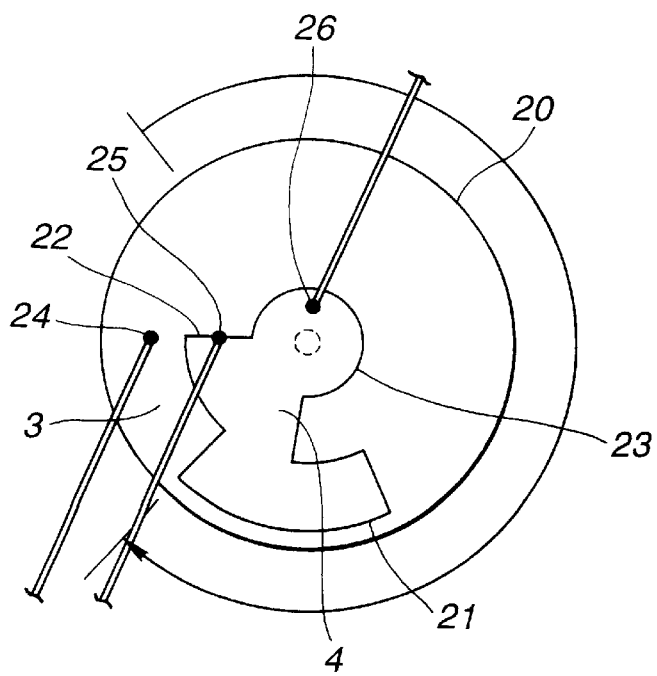

The depressed park circuit 30 is composed of a resistor R22, a capacitor C13, resistors R21, R49 and R20, a transistor TR9 (NPN type), a resistor R33, a capacitor C14, resistors R61 and R62, a transistor TR13 (NPN type), resistors R69 and R70, a transistor TR12 (NPN type) and a resistor R47, and the depressed park circuit 30 is connected with a depressed park prohibition circuit 35 connected to the wiper switch 5. The depressed park prohibition circuit 35 is formed by resistors R59 and R60, a transistor TR14 (NPN type), resistors R39 and R40 and transistor TR20 (PNP type). When the wiper blade 41 continues to move as far as the first turning point A after the wiper switch 5 is switched into the stop mode OFF from the operating mode ON at time t shown in FIG. 11 during the operation of the wiper apparatus, the second contact plate 22 is connected with the second contactor 25 in the state where the first contact plate 21 is out of contact with the first contactor 24 of the position switch 3 as shown in FIG. 17. Consequently, terminal No.6 of the controller 6 rises to "high level", so that the transistor TR11 in the second position detecting circuit 8 is turned on and the transistor TR10 in the second position detecting circuit 8 is turned off, however the electric potential at the terminal No.3 of the controller 6 is not "low level", the transistors TR20 and TR14 are turned off, and the transistor TR13 is also turned off, accordingly the transistor TR9 is turned on and the conductive path is kept to be formed to the emitter of the transistor TR2 in the second drive circuit 14. Therefore, the electric current continues to flow in the relay coil RL2-1 and the wiper blade 41 moves to the depressed park position C set in a position lower than the first turning point A.

Figure 10:
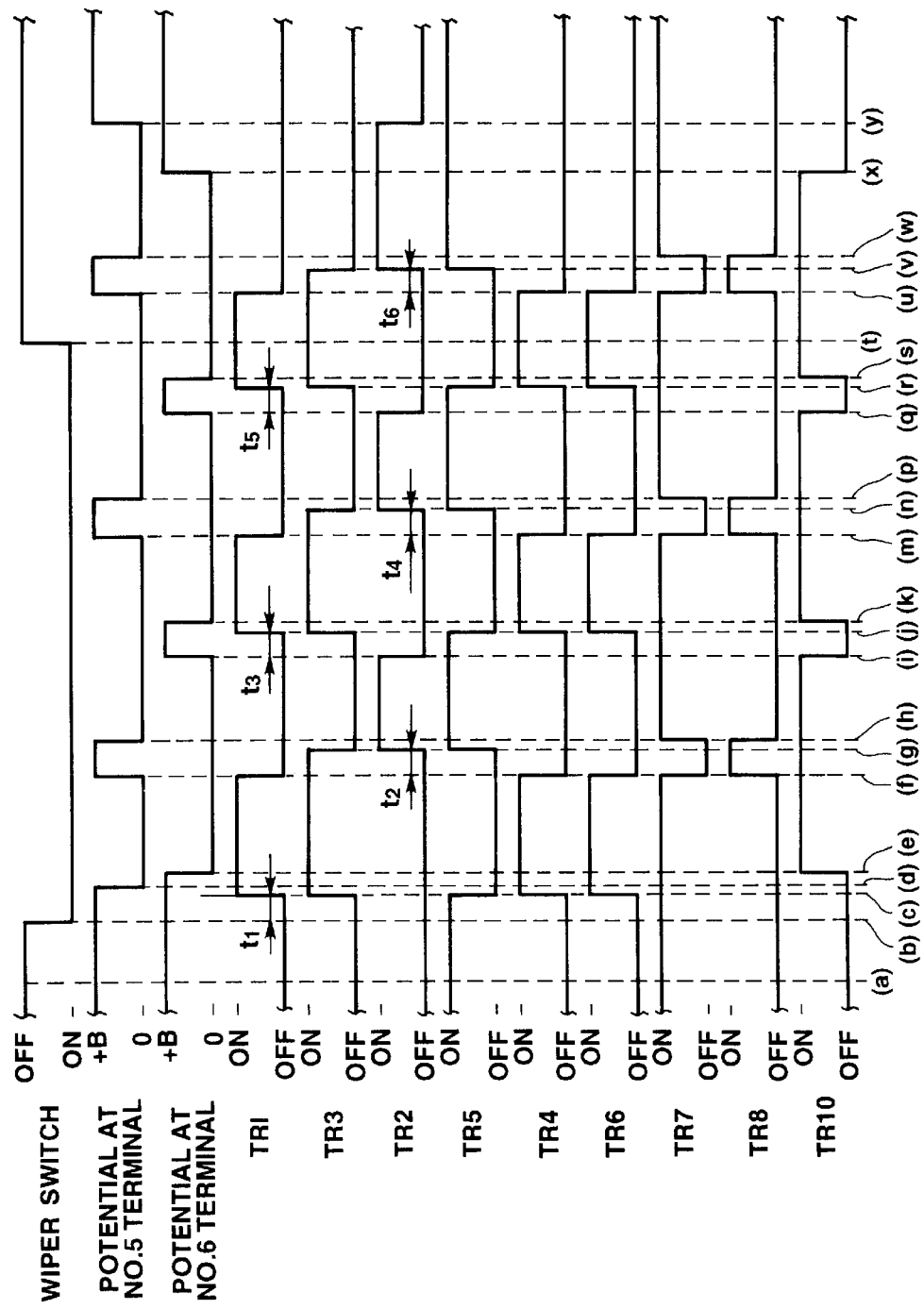
FIGS. 10 to 11 are time charts illustrating control behavior in the circuit shown in FIG. 9.
Figure 11:
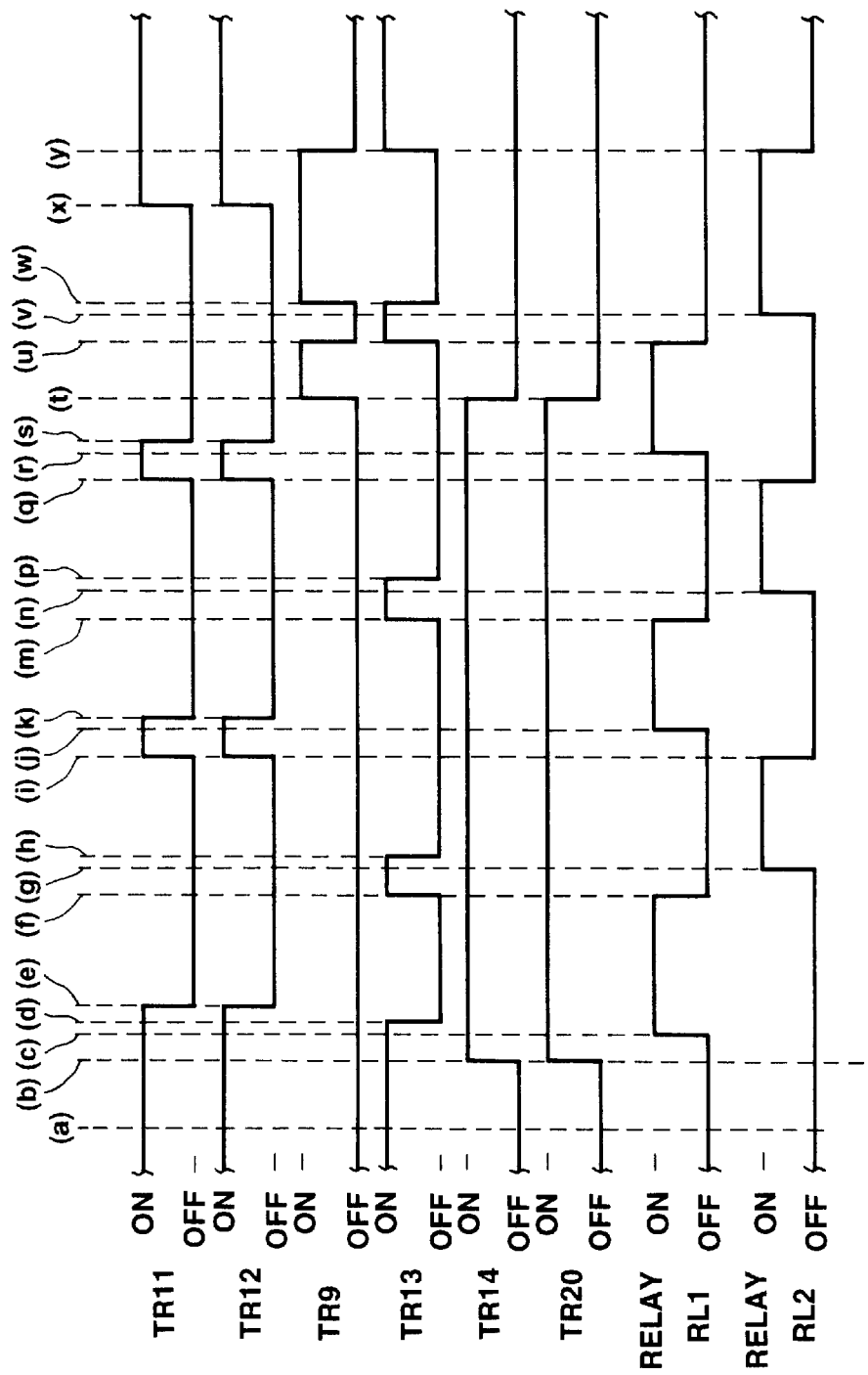
Figure 23:
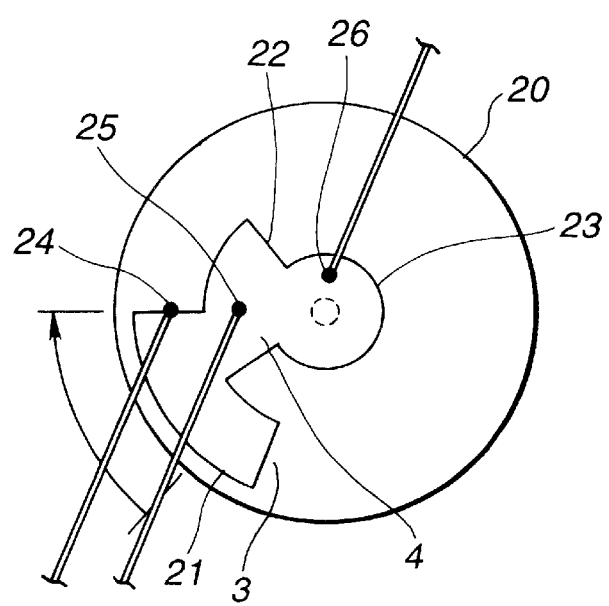

In the depressed park circuit 30, when the wiper blade 41 arrives at the depressed park position C lower than the first turning point A at time y shown in FIGS. 10 and 11, the first contact plate 21 is connected with the first contactor 24 of the position switch 3 as shown in FIG. 23, the terminal No.5 of the controller 6 rises to "high level" and the transistor TR13 is turned on, thereby turning the transistor TR9 off and cutting off the conductive path to the emitter of the transistor TR2 in the second drive circuit 14. Thus the motor 2 stops the forward rotation of the armature shaft 2c and the wiper blade 41 stops in the depressed park position C.

An explanation will be given in detail about the control action of the wiper control device 1 having the aforementioned configuration by using the time charts shown in FIGS. 10 and 11.

At time a, when the wiper switch 5 is in the stop mode OFF, the wiper blade 41 is in the depressed park position C, the electric potential of the terminal No.3 of the controller 6, being connected to the power source through the resistor R42, becomes to "high level". Furthermore, the first contact plate 21 and the second contact plate 22 are connected to the first contactor 24 and the second contactor 25 of the position switch 3, respectively as shown in FIG. 12, so that the terminals No.5 and No.6 of the controller 6 rise "high level", respectively.

According to "high level" of the terminal No.6, the transistor TR1 in the second position detecting circuit 8 is turned on, the transistor TR10 in the second position detecting circuit 8 is turned off, and the conductive path to the emitter of the transistor TR2 in the second drive circuit 14 is interrupted.

Further, according to "high level" at the terminal No.6, the transistor TR12 in the depressed park circuit 30 is turned on, the transistor TR8 in the first position detecting circuit 7 is turned off and the transistor TR7 in the first position detecting circuit 7 is turned on, thereby forming the conductive path to the emitter of the transistor TR1 in the first drive circuit 13. However, the base current is not supplied to the transistor TR1 in the first drive circuit 13 and the transistor TR1 is not turned on.

When the wiper switch 5 is switched from the stop mode OFF to the operating mode ON at time b, the charging of the capacitor C4 in the first turning time delaying circuit 11 is started through the resistor R17 and the diode D1 in the wiper switch detecting circuit 9 since the terminal No.3 of the controller 6 is grounded.

At time c (after the lapse of time t1 from the time b) when the capacitor C4 in the first turning time delaying circuit 11 is charged up to the predetermined voltage, the transistors TR3 and TR1 in the first drive circuit 13 are turned on, respectively. The transistors TR4 and the TR6 in the self-hold circuit 10 are further turned on.

As the transistor TR7 is already in the on-state, an electric current flows in the first relay coil RL1-1 of the first relay RL1 in the first drive circuit 13 in response to the turning on of the transistor TR1 in the first drive circuit 13. Consequently, the first movable contact RL1-2 is connected with the first normal-opened contact RL1-4, an electric current flows in the motor 2 from the power source 50 through the terminal No.7 of the controller 6, the first brush terminal 2a of the motor 2, the second brush terminal 2b of the motor 2, the terminal No.8 of the controller 6, the second movable contact RL2-2 and the second normal-closed contact RL2-3 of the second relay RL2, and the forward rotation of the armature shaft 2c of the motor 2 is started.

Figure 13:
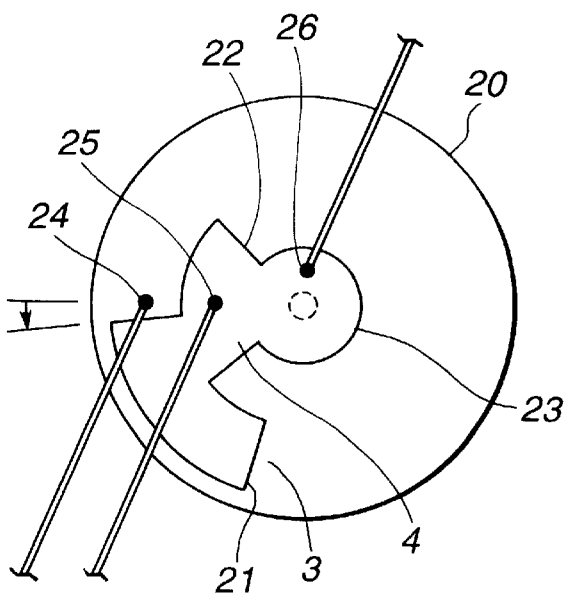

The rotor 20 begins to rotate in the anticlockwise direction shown in FIG. 12 at the same time of the staring of the wiper blade 41 from the depressed park position C toward the second turning point B, and the first contact plate 21 separates from the first contactor 24 in the state where the second contact plate 22 is kept in contact with the second contactor 25 of the position switch 3 at time d as shown in FIG. 13.

As a result, the terminal No.5 drops to "low level" and the transistor TR13 in the depressed park circuit 30 is turned off. In this time, the transistor TR9 remains in the off-state because the wiper switch 5 is in the operating mode ON and the transistors TR20 and TR14 in the depressed park circuit 30 are turned on.

Figure 14:
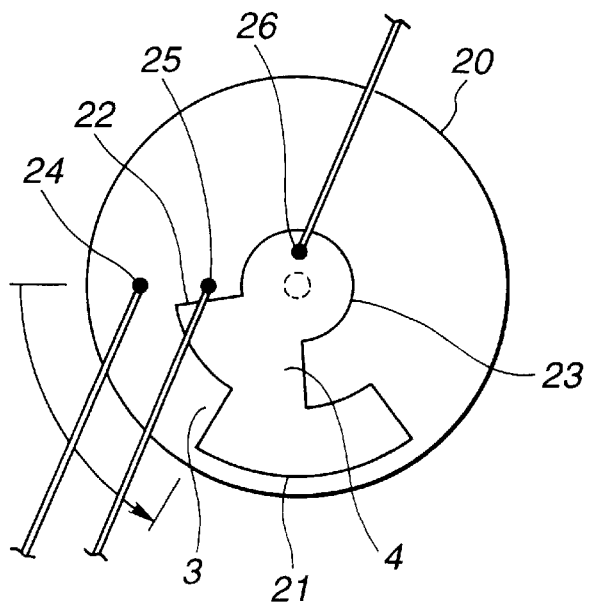

According to the rotation of the rotor 20 in the anticlockwise direction shown in FIG. 13, the second contact plate 22 separates from the second contactor 25 in the state where the first contact plate 21 is kept out of contact with the first contactor 24 of the position switch 3, and the terminal No.6 of the controller 6 drops to "low level" at time e as shown in FIG. 14. Although the transistors TR11 and TR12 are turned off and the transistor TR10 in the second position detecting circuit 8 is turned on, thereby forming the conductive path to the emitter of the transistor TR2 in the second drive circuit 14, the transistor TR2 in the second drive circuit 14 remains in the off-state since the transistor TR5 is not turned on.

Figure 15:
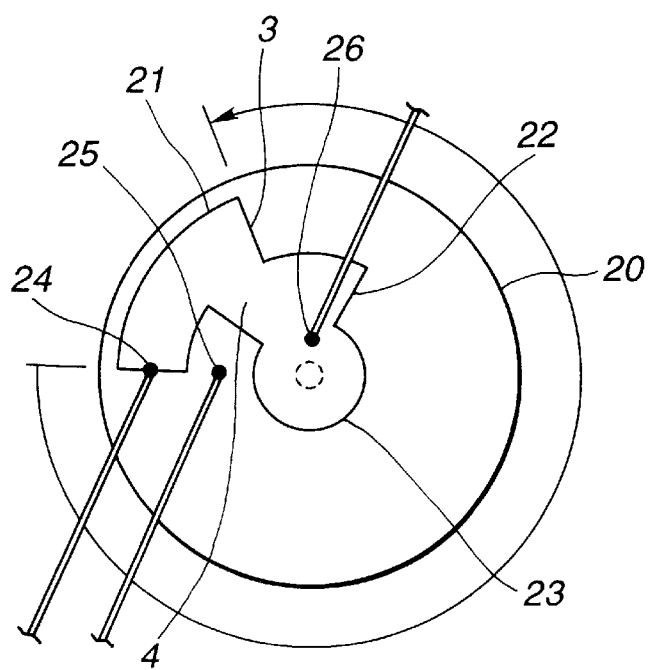

When the wiper blade 41 arrives at the second turning point B at time f by continuation of the forward rotation of the armature shaft 2c of the motor 2, the first contact plate 21 is connected with the first contactor 24 of the position switch 3 as shown in FIG. 15, and the terminal No.5 of the controller 6 rises to "high level".

Therefore, the transistor TR8 in the first position detecting circuit 7 is turned on, the transistor TR7 in the first position detecting circuit 7 is turned off and the conductive path to the emitter of the transistor TR1 in the first drive circuit 13 is interrupted, whereby the transistor TR1 in the first drive circuit 13 is turned off, the electric current does not flow in the first relay coil RL1-1 of the first relay RL1 in the first drive circuit 13, thereby connecting the first movable contact RL1-2 with the first normal-closed contact RL1-3 and cutting off the electric current supplied to the first brush terminal 2a of the motor 2 from the power source 50.

Accordingly, the motor 2 stops the forward rotation of the armature shaft 2c and the rotation of the rotor 20 is also discontinued.

The collector voltage of the transistor TR1 in the first drive circuit 13 rises by the turning off of the transistor TR1, the diode D12 is turned off and the transistor TR4 in the self-hold circuit 10 is turned off, subsequently the base current of the transistor TR1 is extinguished in accordance with that the transistor TR3 in the first drive circuit 13 is turned off.

When the transistor TR1 in the first drive circuit 13 is turned off, the cathode of the diode D11 turned to "high level" from "low level", whereby the diode D11 becomes to the off-state and the charging of the capacitor C3 in the second turning time delaying circuit 12 is started through the resistor R12. At time g, when the capacitor C3 in the second turning time delaying circuit 12 is charged up to the predetermined voltage, the transistors TR5 and TR2 in the second drive circuit 14 are turned on.

The wiper blade 41 suspends at the second turning point B for time t2 after the transistor TR1 in the first drive circuit 13 is turned off at the time f until the transistor TR2 in the second drive circuit 14 is turned on at time g.

When the transistor TR2 in the second drive circuit 14 is turned on at the time g, an electric current flows in the relay coil RL2-1 of the second relay RL2 of the second drive circuit 14 and the second movable contact RL2-2 is connected to the second normal-opened contact RL2-4, whereby an electric current flows in the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the reverse rotation of the armature shaft 2c of the motor 2 is started.

Figure 16:
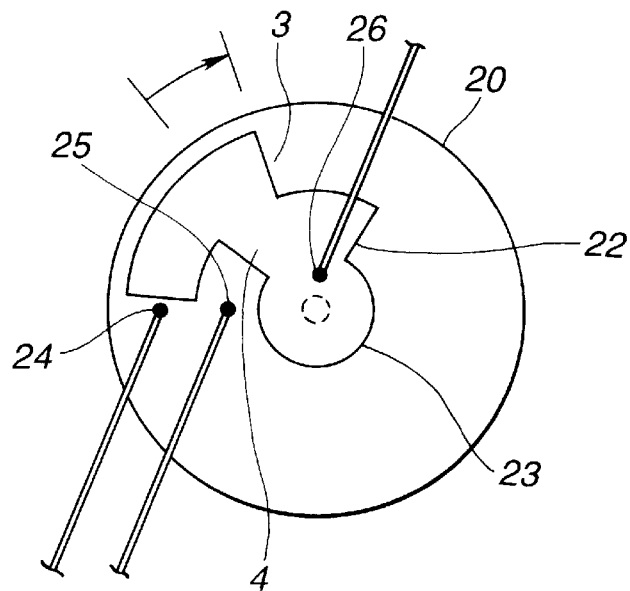

The wiper blade 41 starts to move from the second turning point B toward the first turning point A and the rotor 20 begins to rotate in the clockwise direction in FIG. 15. At time h, the first contact plate 21 separates from the first contactor 24 in the state where the second contact plate 22 is out of contact with the second contactor 25 of the position switch 3 as shown in FIG. 16.

Although the transistors TR8 in the first position detecting circuit 7 is turned on again and the transistor TR7 in the first position detecting circuit 7 is turned on whereby the conductive path is formed to the emitter of the transistor TR1 in the first drive circuit 13, the transistor TR3 is not turned on and the transistor TR1 in the first drive circuit 13 remains in the off-state.

When the wiper blade 41 arrives at the first turning point A at time i according to the reverse rotation of the armature shaft 2c of the motor 2, the second contact plate 22 is connected with the second contactor 25 of the position switch 3 as shown in FIG. 17 and the electric potential at the terminal No.6 of the controller 6 rises to "high level".

According to the "high level" at the terminal No.6 of the controller 6, the transistor TR11 in the second position detecting circuit 8 is turned off and the transistor TR10 in the same circuit 8 is turned off, thereby interrupting the conductive path to the emitter of the transistor TR2 in the second drive circuit 14. Accordingly, the transistor TR2 in the second drive circuit 14 is turned off, the electric current is cut off to the second relay coil RL2-1 of the second relay RL2 in the second drive circuit 14 and the second movable contact RL2-2 is connected with the second normal-closed contact RL2-3, so that the electric current supplied from the power source 50 to the second brush terminal 2b of the motor 2 is cut. The first and second brush terminals 2a and 2b of the motor 2 are shorted to each other through the relay contacts RL1-2, RL1-3, RL2-3 and RL2-2 of the first and second relays RL1 and RL2.

Accordingly, the motor 2 stops the reverse rotation of the armature shaft 2c and the rotation of the rotor 20 is also discontinued at the same time.

The cathode of the diode D10 is turned to "high level" from "low level" according to that the transistor TR2 in the second drive circuit 14 is turned off, the diode D10 becomes to the off-state and the charging of the capacitor C4 in the first turning time delaying circuit 11 is stared through the resistor R17. At time i (after the lapse of time t3 from the time i), when the capacitor C4 in the first turning time delaying circuit 11 is charged up to the predetermined electric potential, the transistor TR3 in the first drive circuit 13 is turned on.

Because the first relay coil RL1-1 of the first relay RL1 in the first drive circuit 13 is excited and the first movable contact RL1-2 is connected with the first normal-opened contact RL1-4, the electric current flows from the power source 50 to the motor 2 through the terminal No.7 of the controller 6, the first brush terminal 2a of the motor 2, the second brush terminal 2b of the motor 2, the terminal No.8 of the controller 6, the second movable contact RL2-2 and the second normal-closed contact RL2-3 of the second relay RL2, and the forward rotation of the armature shaft 2c of the motor 2 is started.

Figure 18:
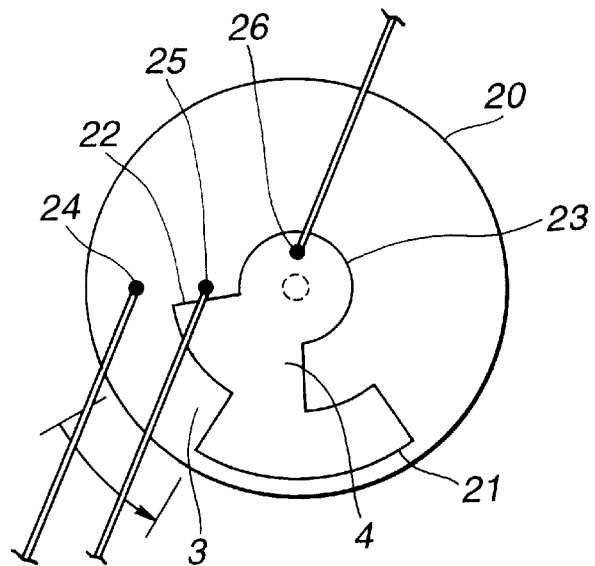

By the forward rotation of the armature shaft 2c of the motor 2, the wiper blade 41 starts to move from the first turning point A toward the second turning point B and the rotor 20 begins to rotate in the anticlockwise direction in FIG. 17. At time k, the second contact plate 22 separates from the second contactor 25 of the position switch 3 as shown in FIG. 18.

After the motor 2 starts the forward rotation of the armature shaft 2c, the respective circuits in the controller 6 work at time m similarly to the case at the time f, at time n similarly to the case at the time g, at the time p similarly to the case at the time h, at time q similarly to the case at the time i, at time r similarly to the case at the time j, and at time s similarly to the case at the time k.

If the wiper switch 5 is switched over into the stop mode OFF at time t when the wiper blade 41 is moving from the first turning point A toward the second turning point B, the electric potential at the terminal No.3 of the controller 6 is turned from "low level" into "high level" through the resistor R42.

The transistors TR4 and TR6 are maintained in the on-states similarly to the case of the first example even after the wiper switch 5 is switched into the stop mode OFF, therefore the transistor TR3 is held in the on-state and the transistor TR20 and the transistor TR14 are also held in the on-states.

Figure 20:
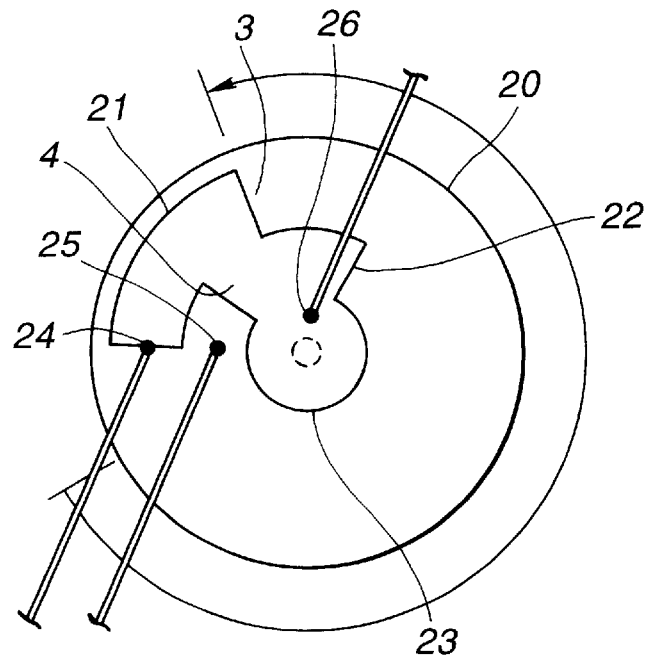

The transistor TR1 in the first drive circuit 13 continues to be in the on-state, when the wiper blade 41 arrives at the second turning point B at time u, the first contact plate 21 is connected with the first contactor 24 of the position switch 3 as shown in FIG. 20 and the electric potential at the terminal No.5 of the controller 6 rises to "high level".

Accordingly, the transistor TR8 in the first position detecting circuit 7 is turned on, and the transistor TR7 in the same circuit 7 is turned off, thereby interrupting the conductive path to the emitter of the transistor TR1 in the first drive circuit 13 and turning the transistor TR1 off. The electric current flowing in the first relay coil RL1-1 of the first relay RL in the first drive circuit 13 is interrupted and the first movable contact RL1-2 is connected with the first normal-closed contact RL1-3, so that the electric current supplied to the first brush terminal 2a of the motor 2 from the power source 50 is cut off.

In this manner, the first brush terminal 2a and the second brush terminal 2b of the motor 2 are shorted to each other, and the motor 2 stops the forward rotation of the armature shaft 2c and the rotation of the rotor 20 is also discontinued at the same time. The cathode of the diode D1 becomes to the off-state according to that the transistor TR1 in the first drive circuit 13 is turned off, the charging of the capacitor C3 in the second turning time delaying circuit 12 is started through the resistor R12, and the transistor TR5 in the second drive circuit 14 is turned on at time v when the capacitor C3 in the second turning time delaying circuit 12 is charged up to the predetermined voltage, whereby the transistor TR2 in the second drive circuit 14 is turned on.

The wiper blade 41 suspends at the second turning point B for tim t6, after the transistor TR1 in the first drive circuit 13 is turned off at the time u until the transistor TR2 in the second drive circuit 14 is turned on at the time v.

When the transistor TR2 in the second drive circuit 14 is turned on, the electric current flows in the second relay coil RL2-1 of the second relay RL2 in the same circuit 14 and the second movable contact RL2-2 is connected with the second normal-opened contact RL2-4, accordingly the electric current flows to the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the armature shaft 2c of the motor 2 begins to rotate in the reverse direction.

Figure 21:
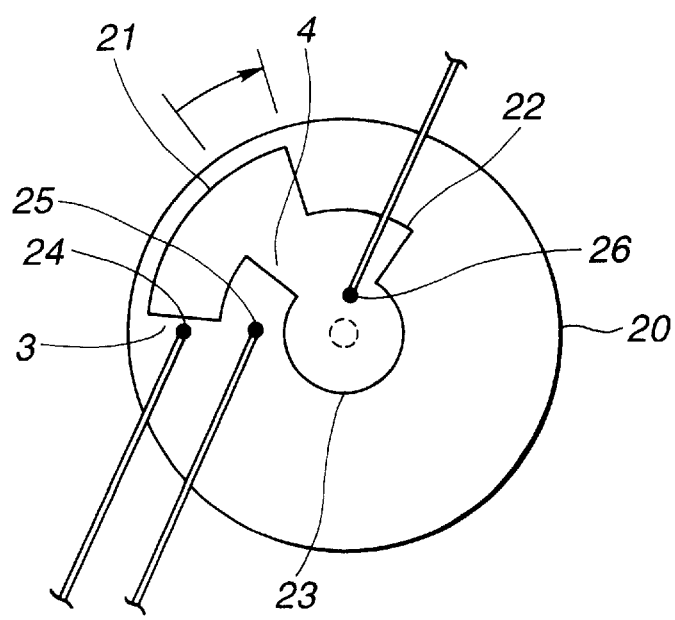

The rotor 20 begins to rotate in the clockwise direction in FIG. 20 together with the start of the wiper blade 41 toward the first turning point A from the second turning point B. At time w, the first contact plate 21 separates from the first contactor 24 of the position switch 3 as shown in FIG. 21 and the terminal No.5 of the controller 6 drops to "low level".

According to the "low level" of the terminal No.5 of the controller 6, the transistor TR8 in the first position detecting circuit 7 is turned off and the transistor TR7 in the same circuit 7 is turned on. As the transistor TR3 in the first drive circuit 13 is not turned on, the transistor TR1 in the same circuit 13 remains in the off-state in spite of forming the conductive path to the emitter of the transistor Tr1 in the first drive circuit 13.

Figure 22:
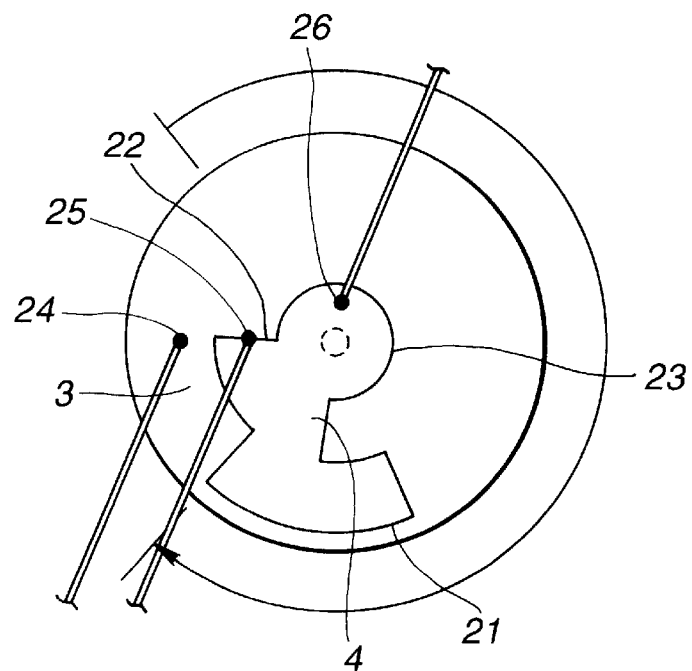

When the wiper blade 41 moves toward the first turning point A according to the reverse rotation of the armature shaft 2c of the motor 2 and arrives at the first turning point A at time x, the second contact plate 22 is connected with the second contactor 25 of the position switch 3 as shown in FIG. 22, and the terminal No.6 of the controller 6 rises to "high level".

Although the transistor TR11 in the second position detecting circuit 8 are turned on and the transistor TR10 in the same circuit 8 is turned off, the conductive path to the emitter of the transistor TR2 in the second drive circuit 14 continues to be held and the transistor TR2 is kept in the on-state because the transistor TR13 is turned off according to that the transistor TR12 in the depressed park circuit 30 and the transistor TR9 is held in the on-state, therefore the electric current continues to flow in the second relay coil RL2-1 of the second relay RL2 in the second drive circuit 14 and the electric current continues to be supplied from the power source 50 to the second brush terminal 2b of the motor 2.

According to the continuation of the current supply to the second brush terminal 2b of the motor 2 from the power source 50, the wiper blade 41 continues to move toward the depressed park position C lower than the first turning point A. When the wiper blade 41 arrives in the depressed park position C at time y, the first contact plate 21 is connected with the first contactor 24 and the terminal No.5 of the controller rises to "high level" in the state where the second contact plate 22 is connected with the second contactor 25 of the position switch 3 as shown in FIG. 23 and the terminal No.6 of the controller 6 is kept in "high level".

The transistor TR13 in the depressed park circuit 30 is turned on owing to the "high level" at the terminal No.5 of the controller 6, and the transistor TR9 is turned off, thereby interrupting the conductive path to the emitter of the transistor TR2 in the second drive circuit 14 and turning the transistor TR2 off. The electric current supplied from the power source 50 to the second brush terminal 2b of the motor 2 is cut off owing to the interruption of the electric current flowing in the second relay RL2.

Although the diode D10 becomes to the off-state in consequence that the transistor TR2 in the second drive circuit 14 is turned off, the capacitor C4 in the first turning time delaying circuit 11 is not charged because the wiper switch 5 is switched to the stop mode OFF, therefore the transistor TR3 in the first drive circuit 13 is not turned on, and the transistor TR1 in the same circuit 13 can not be turned on, accordingly the wiper blade 41 stops in the state of arriving in the depressed park position C.

Figure 24:
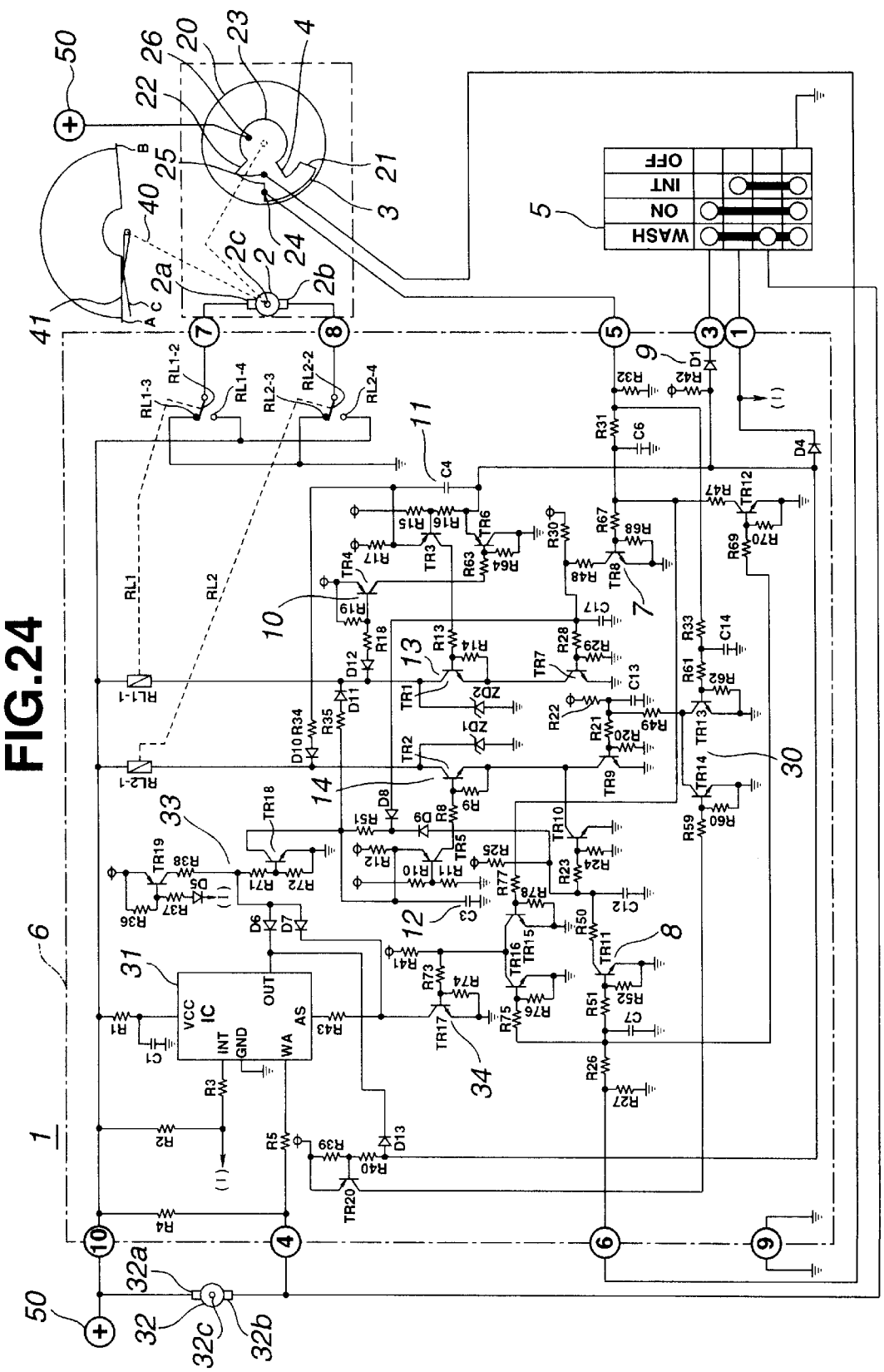
FIG. 24 is a circuit diagram of the wiper control device according to the fourth example of this invention.

FIG. 24 shows the fourth example of the wiper control device according to this invention. The wiper control device in this example is provided with an intermittent drive circuit having a timer IC.

The intermittent drive circuit 31 is composed of the timer IC, a resistor R1, a capacitor C1, resistors R2, R3, R4, R5 and R43, a transistor TR17 (PNP type), resistors R73, R74, R41, R75 and R76, transistors TR16 (NPN type) and TR15 (NPN type), resistors R78 and R77, diodes D6 and D7, resistors R71 and R72, a transistor TR18 (NPN type), a resistor R38, a transistor TR19 (PNP type), resistors R36 and R37 and a diode D5.

In the intermittent drive circuit 31, a prohibition circuit 33 is formed by the transistor TR19, the resistors R36 and R37, the diode D5, the transistor TR18, the resistors R71 and R72, the diodes D8 and D9. When the transistor TR18 in the prohibition circuit 33 becomes to the on-state, the transistors TR7 and TR10 are maintained in the off-states through the diodes D8 and D9 and the first and second drive circuits 13 and 14 are not possible to be actuated.

The timer IC is provided with a power port VCC, an intermittent port INT, a wash port WA, a reset port AS, an output port OUT and a grounding port GND, and the timer IC houses a first wiping timer and an intermittent timer as an intermittent mode timer, and further houses an on-delaying timer and an off-delaying timer as a washer mode timer. The transistor TR18 in the prohibition circuit 33 is held in the off-state and the prohibition circuit 33 is not possible to work while the electric potential at the output port OUT of the timer IC is maintained in a low level by the timer. The timer IC and the prohibition circuit 33 are connected to a reset circuit 34, which is composed of transistors TR15, TR16 and TR17, resistors R75, R76, R77, R78, R73, R74, R41 and R43, and a diode D7. The transistor TR15 becomes to the on-state when the terminal No.5 of the controller 6 is in "high level". The TR16 becomes to the on-state when the terminal No.6 of the controller 6 is in "high level". The transistor TR17 becomes to the off-state when the transistor TR15 or TR16 is in the on-state. The electric potential at the reset port AS of the timer IC rises to "high level" when the transistor TR17 is turned off. Furthermore, the transistor TR18 in the prohibition circuit 33 is held in the off-state through the diode D7 during the on-state of the transistor TR17.

When the electric potential at the intermittent port INT of the timer IC becomes to "low level" through a node (I) by switching the wiper switch 5 to an intermittent mode INT, the intermittent drive circuit 31 starts working, the output port OUT is turned to "low level" from "high level" for predetermined time (0.6 seconds) for wiping in the first time and the output port OUT is turned to "high level" after the lapse of the predetermined time (0.6 seconds).

The transistor TR18 in the prohibition circuit 33 becomes to the off-state while the output port OUT is held in "low level", the transistors TR7 and TR1 are turned on and an electric current flows in the relay coil RL1-1, whereby an electric current flows in the motor 2. The terminals No.5 and No.6 of the controller become to "low level" during the "low level" at the output port OUT, consequently the transistor TR17 in the reset circuit 34 becomes to the on-state. Furthermore, the transistor TR18 in the prohibition circuit 33 is held in the on-state.

When the terminal No.5 of the controller 6 becomes to "high level" before long, the rotation of the motor 2 is discontinued, the transistor TR5 is turned on and the trassistor TR17 is turned off, so that the transistor TR18 in the prohibition circuit 33 becomes to the on-state. The electric potential in "high level" is given to the reset port AS of the timer IC, whereby the timer housed in the timer IC starts counting. When the timer counts out predetermined time, the electric potential at the output port OUT drops again to "low level" temporarily.

When the wiper switch 5 is switched over from the stop mode OFF into the washer mode WASH, the wash port WA drops to "low level" according to "low level" at No.4 terminal of the controller 6, the on-delaying timer (washer mode timer) housed in the timer IC starts, so that the output port OUT of the timer IC is maintained in "high level". The output port OUT of the timer IC drops temporarily to "low level" after the counting up by the on-delaying timer and the transistor TR1 in the first drive circuit 13 is turned on after the capacitor C4 in the first turning time delaying circuit 11 is charged.

A washer motor 32 is connected electrically to the wiper switch 5. The washer motor 32 is provided with a first brush terminal 32a and an armature shaft 32c in addition to a second brush terminal 32b. The first brush terminal 32a of the washer motor 32 is connected to the power source 50 and the armature shaft 32c is connected with a pump (not shown), therefore if the wiper switch 5 is switched into the washer mode WASH, the armature shaft 32c of the washer motor 32 starts the rotation, thereby spraying a cleansing liquid stored in a reservoir (not shown) toward the windshield.

When the wiper switch 5 is switched over from the washer mode WASH to the stop mode OFF, the terminal No.4 of the controller 6 rises to "high level", the wash port WA becomes to "high level", whereby the off-delaying timer housed in the timer IC starts counting, the output port OUT of the timer IC is held in "low level" and the off-delaying timer counts up predetermined time, and then the wiper blade 41 is driven to the depressed park position C by the depressed park circuit 30, and the transistor TR2 in the second drive circuit 14 is turned off at the same time the wiper blade 41 arrives in the depressed park position C.

Figure 25:
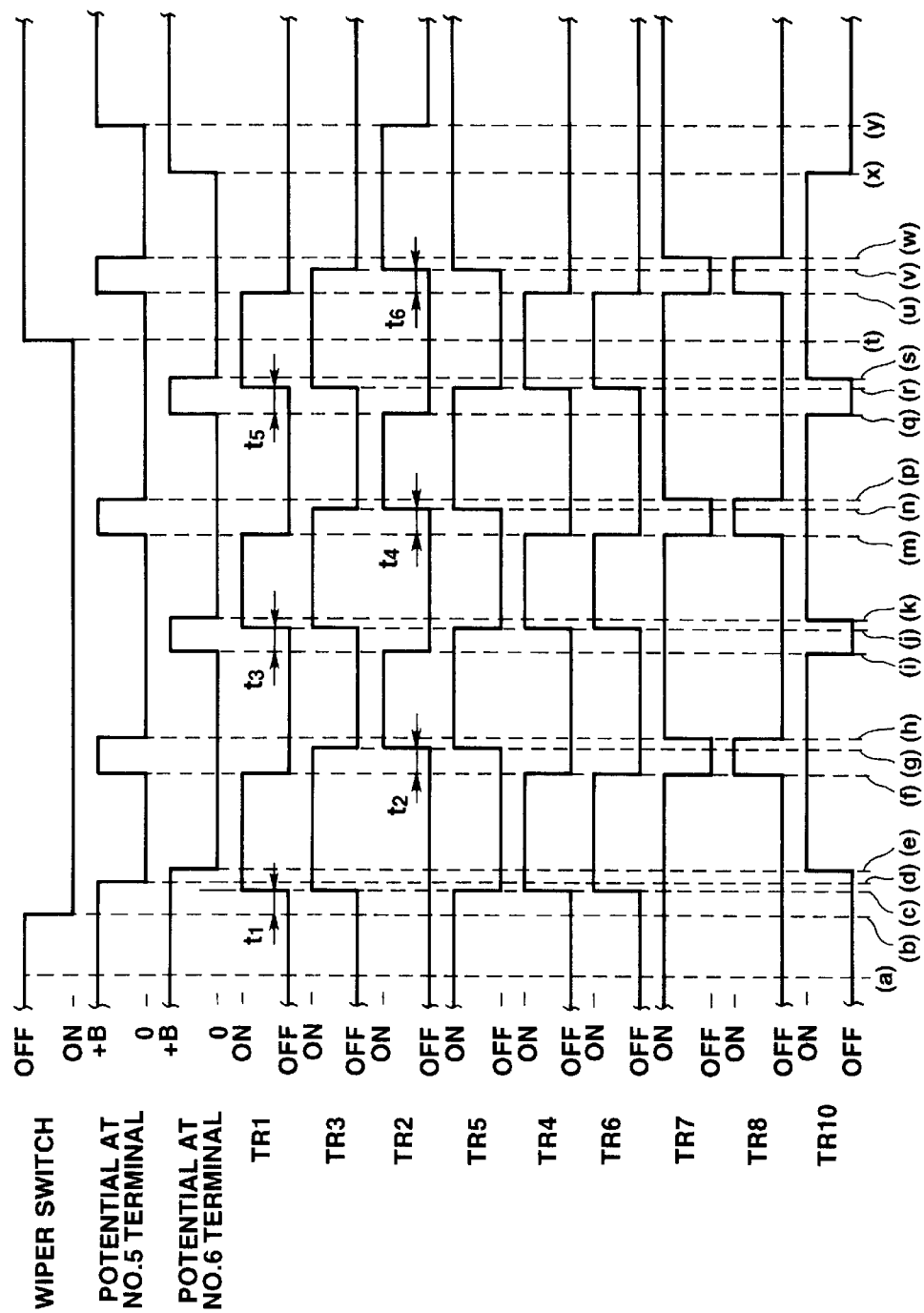
Figure 26:
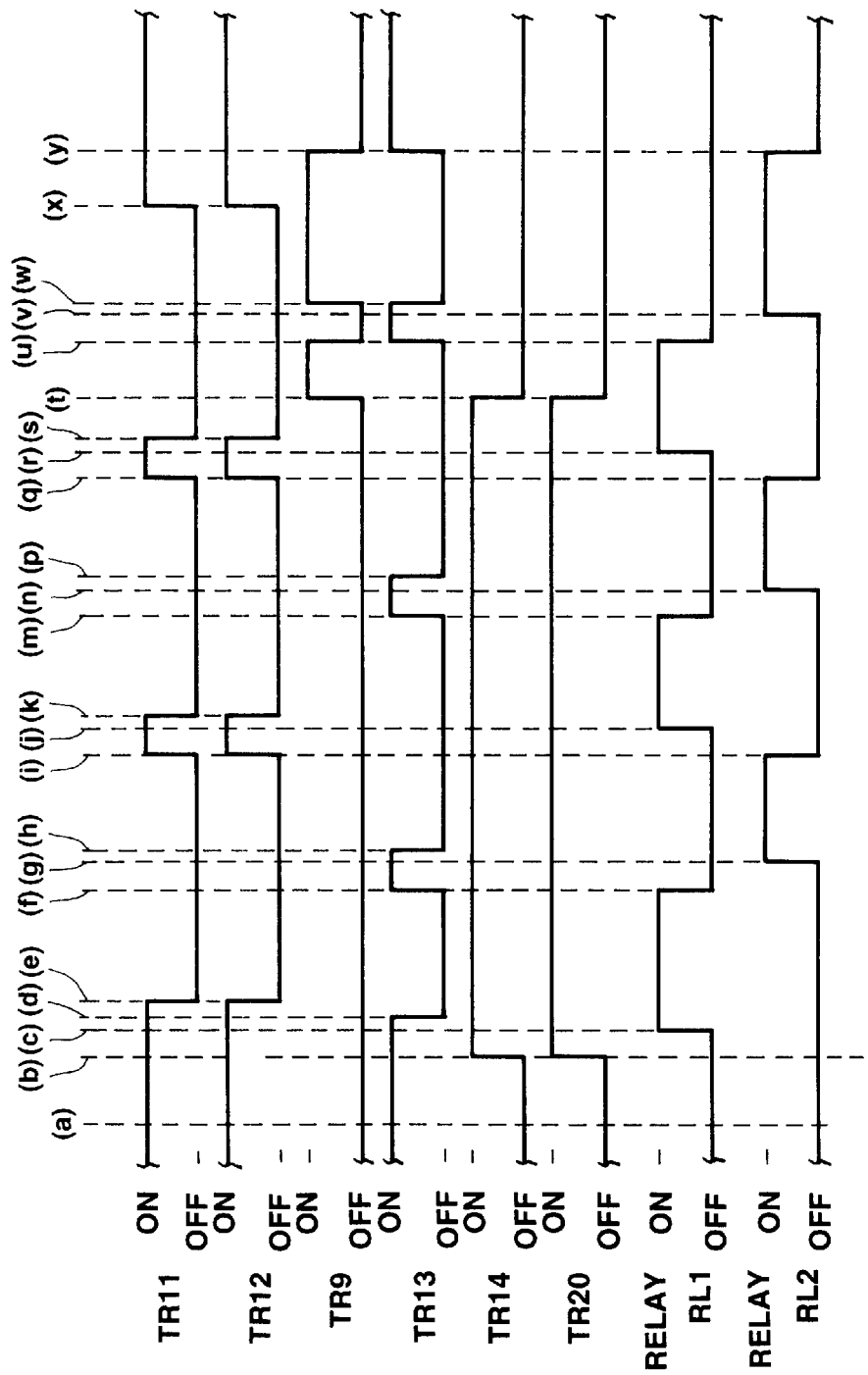

An explanation will be given using the time charts shown in FIGS. 25 to 28 about the control action of the wiper control device 1 having the aforementioned structure. The control action in the operating mode ON is shown in FIGS. 25 and 26, the control action in the intermittent mode INT is shown in FIG. 27 and the control action in the washer mode WASH is shown in FIG. 28.

At time a, when the wiper switch 5 is in the stop mode OFF, the wiper blade 41 is in the depressed park position C and the terminal No.3 of the controller 6 is opened as shown in FIG. 24. In this time, the first and second contact plates 21 and 22 are connected with the first and second contactors 24 and 25 in the position switch 4 and each of the terminals No.5 and No.6 of the controller becomes to "high level".

According to the "high level" at the terminal No.5, the transistor TR9 in the depressed park circuit 30 is turned off. The transistor TR11 in the second position detecting circuit 8 is turned on owing to the "high level" at the terminal No.6, and the transistor TR10 in the same circuit 8 is turned off. Accordingly, the conductive path is interrupted to the emitter of the transistor TR2 in the second drive circuit 14.

The other hand, the transistor TR12 in the depressed park circuit 30 is turned on according to "high level" of the terminal No.6, the transistor TR8 in the first position detecting circuit 7 is turned off and the transistor TR7 in the same circuit 7, thereby forming the conductive path to the emitter of the transistor TR1 in the first drive circuit 13. However, the base current is not given to the transistor TR1 in the first drive circuit 13 and the transistor TR1 is not turned on.

When the wiper switch 5 is switched over from the stop mode OFF to the operating mode ON at time b, the terminal No.3 of the controller 6 is grounded, so that the capacitor C4 in the first turning time delaying circuit 11 begins to be charged through the resistor R17 and the diode D1.

AT time c (after the lapse of time t1 from the time b) when the capacitor C4 in the first turning time delaying circuit 11 is charged up to the predetermined voltage, the transistors TR3 and TR1 in the first drive circuit are turned on, respectively. Furthermore, the transistors TR4 and TR6 in the self-hold circuit 10 are turned on.

In accordance with that the transistor TR1 in the first drive circuit 13 is turned on, an electric current flows in the first relay coil RL1-1 of the first relay RL1 in the same circuit 13 and the first movable contact RL1-2 is connected with the first normal-opened contact RL1-4, whereby an electric current flows in the motor 2 from the power source 50 through the terminal No.7 of the controller 6, the first brush terminal 2a of the motor 2, the second brush terminal 2b of the motor 2, the terminal No.8 of the controller 6, the second movable contact RL2-2 and the second normal-closed contact RL2-3 of the second relay RL2, and the armature shaft 2c of the motor 2 begins to rotate in the forward direction.

The wiper blade 41 starts to move from the depressed park position C toward the second turning point B by the beginning of the forward rotation of the armature shaft 2c of the motor 2, and the rotor 20 begins to rotate in the anticlockwise direction in FIG. 24 at the same time. At time d, the first contact plate 21 separates from the first contactor 24 in the state where the second contact plate 22 is kept in contact with the second contactor 25 of the position switch 3 as shown in FIG. 13.

Whereby the terminal No.5 drops to "low level" and the transistor TR13 in the depressed park circuit 30 is turned off. In this time, the transistor TR9 remains in the off-state because the wiper switch 5 is in the operating mode ON and the transistors TR20 and TR14 in the depressed park circuit 30 are turned on.

In consequence of the rotation of the rotor 20 in the anticlockwise direction in FIG. 13, the second contact plate 22 separates from the second contactor 25 of the position switch 3 as shown in FIG. 14 and the terminal No.6 of the controller 6 drops to "low level" at time e.

The transistors TR11 and TR12 in the second position detecting circuit 8 are turned off, and the transistor TR10 is turned on, thereby forming the conductive path to the emitter of the transistor TR2 in the second drive circuit 14. However, the transistor TR2 in the second drive circuit 14 since the same transistor TR2 is not supplied with the base current.

When the wiper blade 41 arrives at the second turning point B at time f by the continuation of the forward rotation of the armature shaft 2c of the motor 2, the first contact plate 21 is connected with the first contactor 24 of the position switch 3 as shown in FIG. 15, and the electric potential at the terminal No.5 of the controller 6 rises to "high level".

Therefore, the transistor TR8 in the first position detecting circuit 7 is turned on, the transistor TR7 in the same circuit 7 is turned off and the conductive path is interrupted to the emitter of the transistor TR1 in the first drive circuit 13. Consequently, the transistor TR1 in the first drive circuit 13 is turned off, the electric current flowing in the first relay coil RL1-1 of the first relay RL1 in the first drive circuit 13 is cut off and the first movable contact RL1-2 is connected with the first normal-closed contact RL1-3, so that the electric current supplied to the first brush terminal 2a of the motor 2 from the power source 50 is cut off. The first and second brush terminals 2a and 2b are shorted to each other through the contacts RL1-2, RL1-3, RL2-3, and RL2-2, and the motor 2 loses the kinetic energy or the electromagnetic energy suddenly.

The motor 2 stops the forward rotation of the armature shaft 2c and the rotation of the rotor 20 is discontinued at the same time.

When the transistor TR1 in the fist drive circuit 13 is turned off, the collector of the transistor TR1 and the cathode of the diode 11 are turned from "low level" to "high level", whereby the diode D11 becomes non-conductive and the charging of the capacitor C3 in the second turning time delaying circuit 12 is started through the resistor R12. At time g, when the capacitor C3 in the second turning time delaying circuit 12 is charged up to the predetermined voltage, he transistor TR5 in the second drive circuit 14 is turned on, and the transistor TR2 in the same circuit 14 is also turned on. An electric current flows in the second relay coil RL2-1 of the second relay RL2 through the transistors TR2 and TR10 since the transistor TR10 is already in the on-state.

The wiper blade 41 suspends at the second turning point B for the time t2 after the transistor TR1 in the first drive circuit 13 is turned off at the time f until the transistor TR2 in the second drive circuit 14 is turned on at the time g. The motor 2 lose the electromagnetic energy completely during the time of t2. The electric potential at the emitter of the transistor TR3 drops through the diode D10 according to the on-states of the transistors TR2 and TR10, the capacitor C4 is discharged through the diode D10 and the resistor R34 and the transistor TR3 is turned off.

An electric current flows in the second relay coil RL2-1 of the second relay RL2 in the second drive circuit 14 in accordance with that the transistor TR2 in the same circuit 14 is turned on at the time g, and the second movable contact RL2-2 is connected with the second normal-opened contact RL2-4, whereby an electric current flows from the power source 50 to the motor 2 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL2-3 of the first relay RL1, and the armature shaft 2c of the motor 2 begins to rotate in the reverse direction.

The wiper blade 41 starts to move toward the first turning point A from the second turning point B according to the reverse rotation of the armature shaft 2c of the motor 2, and the rotor 20 begins to rotate in the clockwise direction in FIG. 15 at the same time. At time h, the first contact plate 21 separates from the first contactor 24 in the state where the second contact plate 22 is kept out of contact with the second contactor 25 of the position switch 3 as shown in FIG. 16.

In the controller 6, the transistor TR8 in the first position detecting circuit 7 is turned off and the transistor TR7 in the same circuit 7 is turned on since the terminal No.6 drops to "low level", thereby forming the conductive path to the emitter of the transistor TR1 in the first drive circuit 13. However, the transistor TR3 in the first drive circuit 13 is turned off, so that the transistor TR1 in the same circuit 13 remains in the off-state.

When the wiper blade 41 moves toward the first turning point A by the reverse rotation of the armature shaft 2c of the motor 2, and arrives at the first turning point A at time i, the second contact plate 22 is connected with the second contactor 25 in the state the first contact plate 21 is kept out of contact with the first contactor 24 of the position switch 3, whereby the terminal No.6 of the controller 6 rises to "high level".

The transistor TR11 in the second position detecting circuit 8 is turned on, the transistor TR10 in the same circuit 8 is turned off and the conductive path is interrupted to the emitter of the transistor TR2 in the second drive circuit 14, so that the transistor TR2 in the second drive circuit 14 is turned off, the electric current is cut off to flow in the second relay coil RL2-1 of the second rely RL2 in the same circuit 14, the second movable contact RL2-2 is connected with the second normal-closed contact RL2-3 and the electric current is cut off to be supplied to the second brush terminal 2b of the motor 2 from the power source 50.

Accordingly, the motor 2 stops the reverse rotation of the armature shaft 2c and the rotation of the rotor 20 is also discontinued.

When the transistor TR2 in the second drive circuit 14 is turned off, the cathode of the diode D10 is turned from "low level" into "high level", the charging of the capacitor C4 in the first turning time delaying circuit 11 is started, and the transistors TR3 and TR1 in the first drive circuit 13 are turned on at time j (after the lapse of time t3 from the time i) when the capacitor C4 in the first turning time delaying circuit 11 is charged up to the predetermined voltage.

In response to the turning on of the transistor TR1 in the first drive circuit 13, the first relay coil RL1-1 of the first relay RL1 in the same circuit 13 is excited, the movable contact RL1-2 is connected with the first normal-opened contact RL1-4 and the electric current flows to the motor 2 from the power source 50 through the terminal No.7 of the controller 6, the first brush terminal 2a and the second brush terminal 2b of the motor 2, the terminal No.8 of the controller 6, the second movable contact RL2-2 and the second normal-closed contact RL2-3 of the second relay RL2, so that the motor 2 starts again the forward rotation of the armature shaft 2c.

The wiper blade 41 begins to move from the first turning point A toward the second turning point B according to the starting of the forward rotation of the armature shaft 2c of the motor 2, and the rotor 20 begins to rotate in the anticlockwise direction in FIG. 17. At time k, the second contact plate 22 separates from the second contactor 25 in the state where the first contact plate 21 is kept out of contact with the first contactor 24 of the position switch 3 as shown in FIG. 18.

After the motor 2 starts the forward rotation of the armature shaft 2c, the control action is carried out at time m, n, p, q, r and s similarly to the control at the time f, g, h, i, j and k, respectively, and when the wiper switch 5 is switched into the stop mode OFF at time t while the wiper blade 41 is moving toward the second turning point B from the first turning point A, the terminal No.3 of the controller 6 is turned from "low level" to "open".

Figure 19:
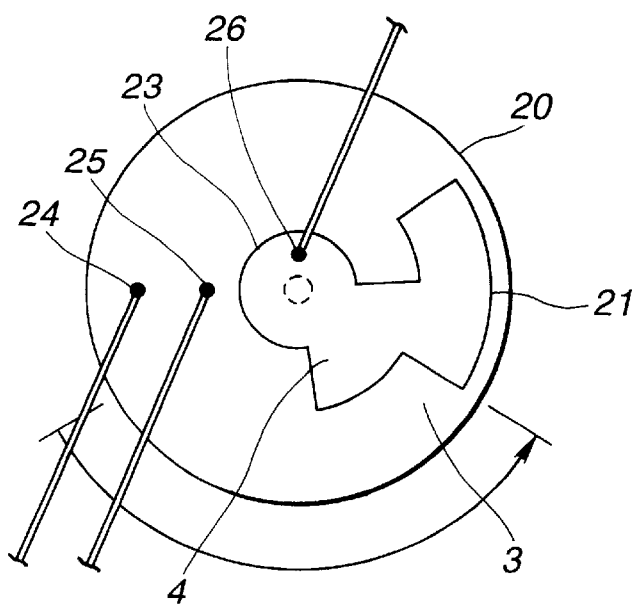

In this time, the first and second contact plates 21 and 22 separate from the first and second contactors 24 and 25 of the position switch 3, respectively as shown in FIG. 19.

Since the respective terminals No.5 and No.6 drop to "low level", the transistor TR8 is turned off and the transistor TR7 is turned on in the first position detecting circuit 7, and the respective transistors TR4, TR6 and TR3 are turned on, the conductive path to the emitter of the transistor TR1 in the first drive circuit 13 is maintained and the transistor TR1 continues to be supplied with the base current, so that the transistor TR1 in the first drive circuit 13 is held in the on-state.

When the wiper blade 41 arrives at the second turning point B at time u according to the continuation of the on-state of the transistor TR1 in the first drive circuit 13, the first contact plate 21 is connected with the first contactor 24 of the position switch 3 as shown in FIG. 20 and the terminal No.5 of the controller rises to "high level".

The transistor TR8 in the first position detecting circuit 7 is turned on and the transistor TR7 in the same circuit 7 is turned off, thereby interrupting the conductive path to the emitter of the transistor TR1 in the first drive circuit 13 and turning off the transistor TR1 in the same circuit 13. Further, the electric current flowing in the first relay coil RL1-1 of the first relay RL1 in the first drive circuit 13 is cut off and the first movable contact RL1-2 is connected with the first normal-closed contact RL1-3, therefore the electric current supplied form the power source 50 to the first brush terminal 2a of the motor 2 is cut off.

The motor 2 stops the forward rotation of the armature shaft 2c by the interruption of the current supply from the power source 50 to the first brush terminal 2a of the motor 2, and the rotation of the rotor 20 is also discontinued.

The electric potential at the collector of the transistor TR1 in the first drive circuit 13 rises according to the off-state of the same transistor TR1, the diode D12 is turned off and the transistors TR4 and TR6 in the self-hold circuit 10 are turned off, whereby the transistor TR3 in the first drive circuit 13 is turned off and the base current to the transistor TR1 disappears.

When the transistor TR1 in the first drive circuit 13 is turned off, the cathode of the diode D11 is turned from "low level" to "high level" and the diode D11 becomes to the off-state, therefore the charging of the capacitor C3 in the second turning time delaying circuit 12 is started. At time v, when the capacitor C3 in the second turning time delaying circuit 12 is charged up to the predetermined voltage, the transistors TR5 and TR2 in the second drive circuit 14 are turned on.

The wiper blade 41 suspends at the second turning point B for time t6 after the transistor TR1 in the first drive circuit 13 is turned off at the time u until the transistor TR2 in the second drive circuit 14 is turned on at the time v.

When the transistor TR2 in the second drive circuit 14 is turned on at the time v, the second relay coil RL2-1 of the second relay RL2 in the second drive circuit 14 is excited and the second movable contact RL2-2 is connected with the second normal-opened contact RL2-4, accordingly the electric current flows to the motor 2 from the power source through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the armature shaft 2c of the motor 2 begins to rotate in the reverse direction.

The wiper blade 41 begins to move toward the first turning point A from the second turning point B according to the starting of the reverse rotation of the armature shaft 2c of the motor 2, and the rotor 20 begins to rotate in the clockwise direction in FIG. 20 at the same time. At time w, the first contact plate 21 separates form the first contactor 24 of the position switch 3 in the state the second contact plate 22 is out of contact with the second contactor 25 as shown in FIG. 21.

Therefore, the transistor TR8 in the first position detecting circuit 7 is turned off and the transistor TR7 in the same circuit 7 is turned on, thereby forming the conductive path to the emitter of the transistor TR1 in the first drive circuit 13. In this time, the transistor TR3 in the first drive circuit 13 is not turned on, and the transistor TR1 in the same circuit 13 remains in the off-state.

When the wiper blade 41 arrives at the first turning point A at time x by the reverse rotation of the armature shaft 2c of the motor 2, the second contact plate 22 is connected with the second contactor 25 of the position switch 3 as shown in FIG. 22 and the terminal No.6 of the controller 6 rises to "high level".

Although the transistor TR11 in the second position detecting circuit 8 is turned on and the transistor TR10 in the same circuit 8 is turned off, the conductive path continues to be held to the emitter of the transistor TR2 in the second drive circuit 14 and the same transistor TR2 remains in the on-state because the transistor TR13 is turned off according to the on-state of the transistor TR12 in the depressed park circuit 30 and the transistor TR9 is held in the on-state, so that the electric current continues to flow in the second relay coil RL2-1 of the second relay RL2 in the second drive circuit 14 and the electric current continues to be supplied from the power source 50 to the second brush terminal 2b of the motor 2.

The wiper blade 41 continues to move toward the depressed park position C lower than the first turning point A according the continuation of the current supply to the second brush terminal 2b of the motor 2 from the power source 50, and when the wiper blade 41 arrives in the depressed park position C at time y, the first contact plate 21 is connected with the contactor 24 and the terminal No.5 of the controller 6 rises to "high level" in the state where the second contact plate 22 is connected with the second contactor 25 of the position switch 3 and the terminal No.6 of the controller 6 is kept in "high level" as shown in FIG. 23.

The transistor TR13 in the depressed park circuit 30 is turned on according to the "high level" of the terminal No.5 of the controller 6 and the transistor TR9 is turned off, thereby interrupting the conductive path to the emitter of the transistor TR2 in the second drive circuit 14 and turning off the same transistor TR2. Therefore, the second relay coil RL2-1 of the second relay RL2 becomes to the unexcited state and the electric current supplied from the power source 50 to the second brush terminal 2b of the motor 2 is cut off.

The transistor TR2 in the second drive circuit 14 is turned off and the diode D10 becomes to the off-state, but the capacitor C4 in the first turning time delaying circuit 11 is not charged as the wiper switch 5 is switched to the stop mode OFF, therefore the transistor TR3 in the first drive circuit 13 is not turned on, the transistor TR1 in the same circuit 13 is not possible to be turned on and the wiper blade 41 stops in the state of arriving in the depressed park position C.

As mentioned above, at the tie a when the wiper switch 5 is in the stop mode OFF, the wiper blade 41 is in the depressed park position C, the terminal No.3 of the controller 6 is in "high level" as shown in FIG. 24 and each of terminals No.5 and No.6 of the controller 6 is in "high level" because the first and second contact plates 21 and 22 are connected with the first and second contactors 24 and 25 of the position switch 3, respectively.

When the wiper switch 5 is switched over from the stop mode OFF into the intermittent mode INT at time b as shown in FIG. 27, No.1 terminal of the controller 6 is grounded, the intermittent port INT of the timer IC drops to "low level" through the node (I), the first wiping timer housed in the timer IC starts and the output port OUT drops to "low level". At the same time, the capacitor C4 in the first turning time delaying circuit 11 begins to be charged through the resistor R17 and the diode D4. Furthermore, the transistor TR19 in the prohibition circuit 33 provided in the intermittent drive circuit 31 is turned on though the node (I), the diode D5 and the resistor R37, and the output port OUT drops to "low level", therefore the transistors TR20 and TR14 in the depressed park circuit 30 are turned on. Although the transistor TR19 is turned on, the transistor TR18 is not turned on owing to "low level" at the output port OUT of the timer IC.

At time c (after the lapse of time t7 from the time b), when the capacitor C4 in the first turning time delaying circuit 11 is charged up to the predetermined voltage after the starting of the charging, the respective transistors TR3 and TR1 in the first drive circuit 13 are turned on in the state the transistor TR3 in the same circuit 13 is turned on. Further the transistors TR4 and TR6 in the self-hold circuit 10 are turned on.

When the transistor TR1 in the first drive circuit 13 is turned on, the first relay coil RL1-1 of the first relay RL1 in the same circuit 13 is excited and the first movable contact RL1-2 is connected with the first normal-opened contact RL1-4, whereby the electric current flows to the motor 2 from the power source 50 through the terminal No.7 of the controller 6, the first brush terminal 2a and the second brush terminal 2b of the motor 2, the terminal No.8 of the controller 6, the second movable contact RL2-2 and the second normal-closed contact RL2-3 of the second relay RL2, and the armature shaft 2c of the motor 2 begins to rotate in the forward direction.

The wiper blade 41 starts to move from the depressed park position C toward the second turning point B according to the start of the forward rotation of the armature shaft 2c of the motor 2, and the rotor 20 begins to rotate in the anticlockwise direction in FIG. 24, so that the first contact plate 21 separates from the first contactor 24 at time d in the state the second contact plate 22 is kept in contact with the second contactor 25 of the position switch 3 as shown in FIG. 13.

Accordingly, the terminal No.5 of the controller 6 drops to "low level" and the transistor TR13 in the depressed park circuit 30 is turned off. In this time, the wiper switch 5 is in the intermittent mode INT and the transistors TR20 and TR14 in the depressed park circuit 30 are turned on, therefore the transistor TR9 remains in the off-state. The capacitor C3 in the second turning time delaying circuit 12 is discharged through the resistor R35 and the diode D11.

By the rotation of the rotor 20 in the anticlockwise direction in FIG. 13, the second contact plate 22 separates from the second contactor 25 as shown in FIG. 14 in the state the first contact plate 21 is kept out of contact with the first contactor 24 of the position switch 3.

The electric potential at the terminal No.6 of the controller 6 drops to "low level", the transistors TR11 and TR12 in the second position detecting circuit 8 are turned off and the transistor TR10 is turned on. Though the conductive path is formed to the emitter of the transistor TR2 in the second drive circuit 14, the transistor TR5 in the same circuit 14 is not turned on and the transistor TR2 remains in the off-state. In this time, the transistor TR16 in the intermittent drive circuit 31 is also turned off and the transistor TR17 in the same circuit 31 is turned on. The reset port AS of the timer IC becomes to "floating" according to the turning on of the transistor TR17. At time e, when time t8 (0.6 seconds) predetermined by the first wiping timer in the timer IC is up after the time b, the output port OUT of the timer IC rises to "high level".

When the wiper blade 41 arrives at the second turning point B at time f according to the continuation of the forward rotation of the armature shaft 2c of the motor 2, the first contact plate 21 is connected with the first contactor 24 in the state the second contact plate 22 is kept out of contact with the second contactor 25 of the position switch 3 as shown in FIG. 15, and the terminal No.5 of the controller 6 rises to "high level".

Consequently, the transistor TR8 in the first position detecting circuit 7 is turned on, the transistor TR7 in the same circuit 7 is turned off and the conductive path is interrupted to the emitter of the transistor TR1 in the first drive circuit 13, whereby the transistor TR1 is turned off, the first relay coil RL1-1 provided to the first relay RL1 in the first drive circuit 13 becomes to the unexcited state, the first movable contact RL1-2 is connected with the first normal-closed contact RL1-3,and the electric current supplied to the first brush terminal 2a of the motor 2 from the power source 50 is cut off.

The motor 2 stops the forward rotation of the armature shaft 2c according to the cutting off of the current supply to the first brush terminal 2a of the motor 2 from the power source 50, so that the rotor 20 also stop the rotation.

The transistor TR15 in the intermittent drive circuit 31 is turned on and the transistor TR17 in the same circuit 31 is turned off. Whereby the reset port AS of the timer IC becomes to "high level" and the intermittent timer in the timer IC starts the counting. In this time, the capacitor C3 in the second turning time delaying circuit 12 is charged through the resistor R12.

The transistor TR18 in the prohibition circuit 33 is held in the on-state for a period of time required for counting predetermined time by the intermittent timer in the timer IC after the time f, therefore the base potential of the transistor TR7 in the first position detecting circuit 7 drops to "low level" through the diode D8, and the transistors TR7 and TR10 are maintained in the off-states through the diode D9.

When the capacitor C3 in the second turning time delaying circuit 12 is charged up to the predetermined voltage at time g, the transistor TR5 in the second drive circuit 14 is turned on. However, the intermittent timer in the timer IC provided in the intermittent drive circuit 31 does not yet count up the predetermined time, so that the transistor TR18 in the prohibition circuit 33 is held in the on-state and the transistor TR10 in the second position detecting circuit 8 is not turned on.

When the intermittent timer in the timer IC provided in the intermittent drive circuit 31 counts up the predetermined period of time t9 at time h, the output OUT of the timer IC drops to "low level", accordingly the transistor TR18 in the prohibition circuit 33 is turned off and the transistor TR10 in the second position detecting circuit 8 is turned on. Whereby the transistors TR5 and TR2 in the second drive circuit 14 are turned on, the second relay coil RL2-1 of the second relay RL2 in the same circuit 14 is excited and the second movable contact RL2-2 is connected with the second normal-opened contact RL2-4, therefore the electric current flows in the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3, and the armature shaft 2c of the motor 2 begins to rotate in the reverse direction. The capacitor C4 in the first turning time delaying circuit 11 is discharged through the resistor R34 and the diode D10.

The wiper blade 41 starts to move from the second turning point B toward the first turning point A according to the start of the reverse rotation of the armature shaft 2c of the motor 2 at the time h, and the rotor 20 begins to rotate in the clockwise direction in FIG. 15, accordingly the first contact plate 21 separates form the first contactor 24 at time d in the state the second contact plate 22 is kept out of contact with the second contactor 25 of the position switch 3 as shown in FIG. 16.

The terminal No.5 of the controller 6 drops to "low level", so that the transistor TR8 in the first position detecting circuit 7 is turned off and the transistor TR7 in the same circuit 7 is turned on, thereby forming the conductive path to the emitter of the transistor TR1 in the first drive circuit 13, but the transistor TR1 remains in the off-state since the transistor TR3 in the same circuit 13 is not turned on.

The output port OUT of the timer IC in the intermittent drive circuit 31 rises to "high level" at time j during the reverse rotation of the armature shaft 2c of the motor 2.

When the wiper blade 41 arrives at the first turning point A at time k, the second contact plate 22 is connected with the second contactor 25 in the state the first contact plate 21 is kept out of contact with the first contactor 25 of the position switch 3 as shown in FIG. 17, whereby the terminal No.6 of the controller 6 rises to "high level".

Accordingly, the transistor TR11 in the second position detecting circuit 8 is turned on and the transistor TR11 in the same circuit 8 is turned off, thereby interrupting the conductive path to the emitter of the transistor TR2 in the second drive circuit 14. The transistor TR2 in the second drive circuit 14 is turned off, the second relay coil RL2-1 of the second relay RL2 disposed in the second drive circuit 14 becomes in the unexcited state and the second movable contact RL2-2 is connected with the second normal-closed contact RL2-3, therefore the electric current is cut off to be supplied to the second brush terminal 2b of the motor 2 from the power source 50.

The motor 2 stops the reverse rotation of the armature shaft 2c and the rotation of the rotor 20 is also discontinued.

When the transistor TR2 in the second drive circuit 14 is turned off, the cathode of the diode D10 is turned to "high level" from "low level" and the charging for the capacitor C4 in the first turning time delaying circuit 11 is started through the resistor R17. At the same time, the intermittent timer in the timer IC starts to count according to "high level" at the reset port AS of the timer IC in the intermittent drive circuit 31.

In this manner, the similar control action is carried out repeatingly as described at the time f, g, h, i, j and k, after this.

If the wiper switch 5 is switched over form the intermittent mode INT to the stop mode OFF, the wiper blade 41 stops after arriving in the depressed park position C similarly in the case of switching the wiper switch 5 to the stop mode OFF from the operating mode ON.

When the wiper switch 5 is switched to the washer mode WASH at time b shown in FIG. 28 from the state in the stop mode OFF at time a, the electric potential at the terminal No.4 of the controller 6 drops to "low level".

An electric current flows in the washer motor 32, the armature shaft 32c of the washer motor 32 starts to rotate and the cleansing liquid stored in the reservoir is sprayed on the wiping area of the windshield.

The wash port WA in the timer IC provided in the intermittent drive circuit 31 drops to "low level" and the on-delaying timer housed in the timer IC starts the counting. The output port OUT in the timer IC rises to "high level" and the transistor TR18 in the prohibition circuit 33 is turned on, so that the transistor TR7 in the first position detecting circuit 7 and the transistor TR10 in the second position detecting circuit 8 are held in the off-state, respectively.

The on-delaying timer in the timer IC counts up after the lapse of time t15 from the time b, therefore the output port OUT in the timer IC is turned to "low level" at time c.

The transistor TR18 in the prohibition circuit 33 is turned off and the charging for the capacitor C4 in the first turning time delaying circuit 11 is started at the same time.

When the capacitor C4 in the first turning time delaying circuit 11 is charged up to the predetermined potential at time d, after the lapse of time t16 from the time c, the respective transistors TR13 and TR1 in the first drive circuit 13 are turned on, the transistors TR4 and TR6 in the self-hold circuit 10 are further turned on.

According to the turning on of the transistor TR1 in the first drive circuit 13, the electric current flows in the first relay coil RL1-1 of the first relay RL1 in the same circuit 13, the first movable contact RL1-2 is connected to the first normal-opened contact RL1-4, therefore the electric current flows in the motor 2 from the power source 50 through the terminal No.7 of the controller 6, the first brush terminal 2a and the second brush terminal 2b of the motor 2, the terminal No.8 of the controller 6, the second movable contact RL2-2 and the second normal-closed contact RL2-3 of the second relay RL2 and the armature shaft 2c of the motor 2 begins to rotate in the forward rotation.

The control action is carried out similarly in the case at the time c to the time w shown in FIG. 26 after the armature shaft 2c of the motor 2 starts the forward rotation.

When the wiper switch 5 is switched to the stop mode OFF at time f shown in FIG. 28 while the wiper blade 41 is moving toward the second turning point B from the first turning point A, the terminal No.4 of the controller 6 is changed from "low level" to "high level". The terminal No.3 is also turned to "high level". In this time, the capacitor C4 is grounded through the diode D13 because the output port OUT of the timer IC is held in "low level" for time t17 by the off-delaying timer.

Consequently, the wash port WA of the timer IC rises to "high level" and the rotation of the armature shaft 32c of the washer motor 32 is discontinued, thereby stopping the spray of the cleansing liquid. Furthermore, the off-delaying timer housed in the timer IC starts the time counting and the output port OUT of the timer IC is maintained in "low level" for the time t17 by the off-delaying timer, whereby the transistor TR18 in the prohibition circuit 33 is turned off and the transistor TR7 in the first position detecting circuit 7 continues to be turned on. The wiper blade 41 arrives at the second turning point B at time g by the continuation in the excited state of the first relay coil RL1-1 of the first relay RL1.

When the wiper blade 41 arrives at the second turning point B, the first contact plate 21 is connected with the first contactor 24 in the state where the second contact plate 22 is out of the contact with the second contactor 25 of the position switch 3 as shown in FIG. 20, and the terminal No.5 rises to "high level".

The transistor TR8 in the first position detecting circuit 7 is turned on, the transistor TR7 in the same circuit 7 is turned off and the conductive path to the emitter of the transistor TR1 in the first drive circuit 13 is interrupted, whereby the transistor TR1 is turned off, the electric current is interrupted to flow in the first relay coil RL1-1 of the first relay RL1 in the first drive circuit 13, the first movable contact RL1-2 is connected with the first normal-closed contact RL1-3 and the electric current supplied from the power source 50 to the first brush terminal 2a of the motor 2 is cut off.

The motor 2 stops the forward rotation of the armature shaft 2c and the rotor 20 is also discontinued to rotate.

When the transistor TR1 in the first drive circuit 13 is turned off, the cathode of the diode D11 is changed to "high level" from "low level" and the charging of the capacitor C3 in the second turning time delaying circuit 12 is started through the resistor R12. At time h, when the capacitor C3 in the second turning time delaying circuit 12 is charged up to the predetermined potential, the transistor TR5 in the second drive circuit 14 is turned on in the on-state of the transistor TR10 in the second position detecting circuit 8, and the transistor TR2 in the second drive circuit 14 is turned on.

The wiper blade 41 suspends at the second turning point B for time t18 after the transistor TR1 in the first drive circuit 13 is turned off at the time g until the transistor TR2 in the second drive circuit 14 is turned on at the time h.

When the transistor TR2 in the second drive circuit 14 is turned on at the time h, the second relay coil RL2-1 of the second relay RL2 in the same circuit 14 is excited and the second movable contact RL2-2 is connected with the second normal-opened contact RL2-4, so that the electric current flows in the motor 2 from the power source 50 through the terminal No.8 of the controller 6, the second brush terminal 2b of the motor 2, the first brush terminal 2a of the motor 2, the terminal No.7 of the controller 6, the first movable contact RL1-2 and the first normal-closed contact RL1-3 of the first relay RL1, and the armature shaft 2c of the motor 2 begins to rotate in the reverse direction.

After the wiper blade 41 starts to move toward the first turning point A from the second turning point B, the first contact plate 21 separates from the first contactor 24 of the position switch 3 and the terminal No.5 of the controller 6 drops to "low level".

The transistor TR8 in the first position detecting circuit 7 is turned off and the transistor TR7 in the same circuit 7 is turned on, thereby forming the circuit to the emitter of the transistor TR1 in the first drive circuit 13, but the transistor TR1 remains in the off-state since the transistor TR3 in the same circuit 13 is not turned on.

When the wiper blade 41 arrives at the first turning point A at time i by the reverse rotation of the armature shaft 2c of the motor 2, the second contact plate 22 is connected with the second contactor 25 of the position switch 3 and the terminal No.6 of the controller 6 rises to "high level".

In response to that the transistor TR2 in the second drive circuit 14 is turned off, the charging for the capacitor C4 in the first turning time delaying circuit 11 is started through the resistor R17. When the capacitor C4 in the first turning time delaying circuit 11 is charged up to the predetermined electric potential at time j after the lapse of time t19 from the time i, the transistor TR3 in the first drive circuit 13 is turned on again and the transistor TR1 in the same circuit 13 is turned on.

Accordingly, the motor 2 starts again the forward rotation of the armature shaft 2c.

When the off-delaying timer housed in the timer IC in the intermittent drive circuit 31 counts up the predetermined time at time k while the wiper blade 41 is moving toward the second turning point B from the first turning point A, the output port OUT of the timer IC rises to "high level". Although the diode D3 becomes to "open", the capacitor C4 is grounded continuously through the self-hold circuit 10.

After this, the wiper blade 41 stops at time m after the arrival in the depressed park position C through the similar process at the time t to the time y shown in FIG. 26.

What is claimed is:

1. A wiper control device for controlling a wiper apparatus of a vehicle comprising;
    a motor provided with a first and a second terminal, and a shaft connected to the wiper apparatus and rotatable in forward and reverse directions;
    A wiper switch for generating an on-signal or an off-signal;
    a position switch provided with a rotating disc connected with the shaft of said motor, a first and a second metallic contact plate disposed on said rotating disc and connected with each other, a first contactor disposed slidably on said rotating disc for generating a first turning signal according to electric contact with said first contact plate, and a second contactor disposed slidably on said rotating disc for generating a second turning signal according to electric contact with said second contact plate;
    a first relay having a first relay coil and a first relay contact connected to the first terminal of said motor for supplying an electric current to said motor in a forward rotational direction;
    a second relay having a second relay coil and a second relay contact connected to the second terminal of said motor for supplying an electric current to said motor in a reverse rotational direction;
    a first drive circuit connected to said first relay coil for supplying an electric current to said first relay coil;
    a second drive circuit connected to said second relay coil for supplying an electric current to said second relay coil;
    a first position detecting circuit connected to said first drive circuit and the first contactor of said position switch for detecting the first turning signal and interrupting the electric current supplied to said first relay coil from said first drive circuit;
    a second position detecting circuit connected to said second drive circuit and the second contactor of said position switch for detecting the second turning signal and interrupting the electric current supplied to said second relay coil from said second drive circuit;
    a first delaying circuit connected to said wiper switch and a node between said second relay coil and said second drive circuit, and further connected to said first drive circuit for supplying a signal generated by said second drive circuit or said wiper switch to said first drive circuit after delaying the timing for a predetermined time;
    a second delaying circuit connected to a node between said first relay coil an said first drive circuit for supplying a signal generated by said first drive circuit to said second drive circuit after delaying the timing for a predetermined time; and
    a holding circuit connected to said first drive circuit and a node between said first relay coil and said first drive circuit for supplying a self holding signal to said first drive circuit.

2. A wiper control device as set forth in claim 1, wherein said position switch is further provided with a third contact plate connected to the second contact plate, and a third contactor grounded and disposed slidably on said third contact plate.

3. A wiper control device as set forth in claim 1, wherein said position switch is further provided with a third contact plate connected to the second contact plate, and a third contactor connected to a power source and disposed slidably on said third contact plate.

4. A wiper control device as set forth in claim 1, wherein said first and second contact plates are formed in arcuate shape, respectively.

5. A wiper control device as set forth in claim 4, wherein said position switch is further provided with a third contact plate formed in disc-like shape and connected to the second contact plate, and a third contactor grounded and disposed slidably on said third contact plate.

6. A wiper control device as set forth in claim 4, wherein said position switch is further provided with a third contact plate formed in disc-like shape and connected to the second contact plate, and a third contactor connected to a power source and disposed slidably on said third contact plate.

7. A wiper control device as set forth in claim 1, wherein the device is further provided with a prohibition circuit connected to said first and second drive circuits for holding said first and second drive circuits in off-states, respectively;

a timer circuit connected to said wiper switch and said prohibition circuit for generating a signal to cancel the working of said prohibition circuit and supplying the signal to said prohibition circuit for a predetermined time in response to the on-signal supplied from said wiper switch; and a reset circuit connected to said position switch for supplying a reset signal to said timer circuit.

8. A wiper control device for controlling a wiper apparatus of a vehicle comprising:

a motor provided with a first and a second terminal, and a shaft connected to the wiper apparatus and rotatable in forward and reverse directions;

a wiper switch for generating an on-signal or an off-signal;

a position switch provided with a rotating disc connected with the shaft of said motor, a first and a second metallic contact plate disposed on said rotating disc and connected with each other, a first contactor disposed slidably on said rotating disc for generating a first turning signal or a park signal according to electric contact with said first contact plate, and a second contactor disposed slidably on said rotating disc for generating a second turning signal according to electric contact with said second contact plate;

a first relay having a first relay coil and a first relay contact connected to the first terminal of said motor for supplying an electric current to said motor in a forward rotational direction;

a second relay having a second relay coil and a second relay contact connected to the second terminal of said motor for supplying an electric current to said motor in a reverse rotational direction;

a first drive circuit connected to said first relay coil for supplying an electric current to said first relay coil;

a second drive circuit connected to said second relay coil for supplying an electric current to said second relay coil;

a first position detecting circuit connected to said first drive circuit and the first contactor of said position switch for detecting the first turning signal and interrupting the electric current supplied to said first relay coil from said first drive circuit;

a second position detecting circuit connected to said second drive circuit and the second contactor of said position switch for detecting the second turning signal and interrupting the electric current supplied to said second relay coil from said second drive circuit;

a first delaying circuit connected to said wiper switch and a node between said second relay coil and said second drive circuit, and further connected to said first drive circuit for supplying a signal generated by said second drive circuit or said wiper switch to said first drive circuit after delaying the timing for a predetermined time;

a second delaying circuit connected to a node between said first relay coil and said first drive circuit for supplying a signal generated by said first drive circuit to said second drive circuit after delaying the timing for a predetermined time;

a holding circuit connected to said first drive circuit and a node between said first relay coil and said first drive circuit for supplying a self holding signal to said first drive circuit;

a depressed park circuit connected to the first and second contactors of said position switch and said first and second position detecting circuits for holding the electric current supplied to said second relay coil from said second drive circuit according to the second turning signal generated form the second contactor of said position switch and interrupting the electric current supplied to said second relay coil from said second drive circuit according to the park signal generated from the first contactor of said position switch; and a first prohibition circuit connected to said depressed park circuit and said wiper switch for prohibiting working of said depressed park circuit while said wiper switch is generating the on-signal.

9. A wiper control device as set forth in claim 8, wherein said position switch is further provided with a third contact plate connected to the second contact plate, and a third contactor grounded and disposed slidably on said third contact plate.

10. A wiper control device as set forth in claim 8, wherein said position switch is further provided with a third contact plate connected to the second contact plate, and a third contactor connected to a power source and disposed slidably on said third contact plate.

11. A wiper control device as set forth in claim 8, wherein said first and second contact plates are formed in arcuate shape, respectively.

12. A wiper control device as set forth in claim 11, wherein said position switch is further provided with a third contact plate formed in disc-like shape and connected to the second contact plate, and a third contactor grounded and disposed slidably on said third contact plate.

13. A wiper control device as set forth in claim 11, wherein said position switch is further provided with a third contact plate formed in disc-like shape and connected to the second contact plate, and a third contactor connected to a power source and disposed slidably on said third contact plate.

14. A wiper control device as set forth in claim 8, wherein the device is further provided with a second prohibition circuit connected to said first and second drive circuits for holding said first and second circuits in off-states, respectively;

a timer circuit connected to said wiper switch and said second prohibition circuit for generating a signal to cancel the working of said second prohibition circuit and supplying the signal to said second prohibition circuit for a predetermined time in response to the on-signal supplied from said wiper switch; and a reset circuit connected to said position switch and said timer circuit for supplying a reset signal to said timer circuit.

* * * * *